US012637376B2

(12) United States Patent (10) Patent No.: US 12,637,376 B2
Marcotte et al. (45) Date of Patent: May 26, 2026

(54) OZONE TREATMENT OF MINING EFFLUENTS

(71) Applicant: ASDR Canada Inc., Malartic (CA)

(72) Inventors: Pascal Marcotte, Calgary (CA); Christian Dube, Malartic (CA)

(73) Assignee: ASDR CANADA INC., Malartic (CA)

( * ) Notice: Subject to any disclaimer, the term of this patent is extended or adjusted under 35 U.S.C. 154(b) by 386 days.

(21) Appl. No.: 18/551,762

(22) PCT Filed: Mar. 24, 2022

(86) PCT No.: PCT/IB2022/052680
§ 371 (c)(1),
(2) Date: Sep. 21, 2023

(87) PCT Pub. No.: WO2022/201076
PCT Pub. Date: Sep. 29, 2022

(65) Prior Publication Data
US 2024/0092669 A1 Mar. 21, 2024

Related U.S. Application Data

(60) Provisional application No. 63/166,037, filed on Mar. 25, 2021.

(51) Int. Cl.
| | |
|---|---|
| *C02F 9/00* | (2023.01) |
| *C02F 1/66* | (2023.01) |
| *C02F 1/76* | (2023.01) |
| *C02F 1/78* | (2023.01) |
| *C02F 5/06* | (2023.01) |

(Continued)

(52) U.S. Cl.
CPC .................. *C02F 9/00* (2013.01); *C22B 3/44* (2013.01); *C02F 1/66* (2013.01); *C02F 1/766* (2013.01); *C02F 1/78* (2013.01); *C02F 5/06* (2013.01); *C02F 2101/163* (2013.01); *C02F 2101/166* (2013.01); *C02F 2101/18* (2013.01);
(Continued)

(58) Field of Classification Search
None
See application file for complete search history.

(56) References Cited

U.S. PATENT DOCUMENTS

| | | | | | |
|---|---|---|---|---|---|
| 4,105,545 | A | * | 8/1978 | Muller | ..................... C02F 9/00 210/631 |
| 5,482,694 | A | | 1/1996 | Jara et al. | |
| 6,264,847 | B1 | | 7/2001 | Ushio et al. | |

FOREIGN PATENT DOCUMENTS

| | | |
|---|---|---|
| CN | 104086053 | 10/2014 |
| CN | 104261625 | 1/2015 |

(Continued)

OTHER PUBLICATIONS

Ozone solubility, << https://ozonesolutions.com/blog/ozone-solubility/ >> (Year: 2021).*
(Continued)

*Primary Examiner* — Krishnan S Menon

(57) ABSTRACT

A method of treating mining effluents containing at least one of nitrogen or cyanide species, the method comprising injecting ozone in the mining effluent in successive treatments performed at different pH. Also, a method of treating mining effluents with bromide and ozone. Also, a method of treating mining effluents containing cyanates with ozone at a relatively low pH.

17 Claims, 22 Drawing Sheets

(51) Int. Cl.
| | |
|---|---|
| *C02F 101/16* | (2006.01) |
| *C02F 101/18* | (2006.01) |
| *C02F 101/20* | (2006.01) |
| *C02F 103/10* | (2006.01) |
| *C22B 3/44* | (2006.01) |

(52) U.S. Cl.
CPC ...... *C02F 2101/20* (2013.01); *C02F 2103/10* (2013.01); *C02F 2301/08* (2013.01)

(56) References Cited

FOREIGN PATENT DOCUMENTS

| | | |
|---|---|---|
| CN | 106242191 | 12/2016 |
| CN | 109553211 | 4/2019 |
| EP | 284754 | 10/1988 |
| GB | 674281 | 6/1952 |
| WO | 2018051376 | 3/2018 |
| WO | WO-2018051376 A1 * | 3/2018 .............. C02F 1/766 |

OTHER PUBLICATIONS

Xiuwei Ao et al., Degradation of sulfamethoxazole by medium pressure UV and oxidants: Peroxymonosulfate, persulfate, and hydrogen peroxide, Chemical Engineering Journal, Dec. 2016, 629-637, 313.

F. Barriga-Ordonez et al., Cyanide oxidation by ozone in a steady-state flow bubble column, Minerals Engineering, Oct. 2005, 117-122, 19.

Johanna Georgina Derks, Degradation of organic micropolluants by advanced oxidation throught UV/,TU Delft, Jan. 2010, 136p.

Derrick J. Mah et al., The Effectiveness of Ozone-chlorine Treatment for Reducing Chloramine Concentration Compared to Chlorine Treatment in Swimming Pools and Whirlpools, BCIT School of Health Sciences, Environmental Health, Aug. 2014, 11p.

W. Douglas Gould et al., A critical review on destruction of thiocyanate in mining effluents, Minerals Engineering, May 2012, 38-47, 34.

Eman A. Emam, Effect of ozonation combined with heterogeneous catalysts and ultraviolet radiation on recycling of gas-station wastewater, Egyptian Journal of Petroleum, Jul. 2011, 55-60, 21.

–Environnement Canada, Health Canada, Screening Assessment for the Challenge Bromic acid, potassium salt (Potassium bromate), Gouvernement of Canada, Sep. 2010, 52p.

Carolina Gonzalez-Merchan et al., Simultaneous Treatment of Thiocyanates and Ammonia Nitrogen in Gold Mine Effluents Using Advanced Oxidation and Nitrification-Denitrification Processes, Mine Water and Circular Economy, Jun. 2017, 9 pages.

Matthew A. Brooks, Breakpoint chlorination as an alternate means of ammonia/nitrogen removal at a water reclamation plant, Faculty of the Virginia Polytechnic Institute and State University, Apr. 1999, 99p.

A. N. Hristov et al., Review: Ammonia emissions from dairy farms and beef feedlots, Canadian Journal of Animals Science, Mar. 2011, 1-35, 91-1.

Ju-Chang Huang and Chii Shang, Air stripping, Handbook of Environmental Engineering, Dec. 2013,47-49, 4.

Johannes Jermakka et al., Potential Technologies for the Removal and Recovery of Nitrogen Compounds from Mine and Quarry Waters in Subarctic Conditions, Jan. 2015, 703-748, 45.

Rahul Kumar et al., Remediation of cyanide-contaminated environments through microbes and plants: a review of current knowledge and future perspectives, Geosystem Engineering, Aug. 2016, 28-40, 20-1.

M.W. Lister, The reaction between cyanate and hypochlorite, Canadian Journal of Chemistry, Apr. 1956, 489-501, 34-4.

Ljubica Simovic, Kinetics of natural degradation of cyanide from gold mill effluents, McMaster University, May 1984, 369 p.

Jeanne Luh et al., Kinetics of Bromochloramine Formation and Decomposition, Environmental Science & technology, Jan. 2014, 2517-3094, 48-5.

Xianping Luo et al., Treatment of Ammonia Nitrogen Wastewater in Low Concentration u Two-stage Ozonation, International Journal of Environmental Research and Public Health, Sep. 2015, 11975-11987, 12-9.

Victor M. Luque-Almagro et al., Exploring anaerobic environments for cyanide and cyano-derivatives microbial degradation, Applied Microbiology and Biotechnology, Dec. 2017, 1067-1074, 102.

Y. Matsuda et al., Ozonation of Cyanate Ion in Alkaline Solution, Canadian Journal of Chemistry, Jun. 1981, 86-88, 33.

Angelo L. Mezzei et al., Mass transfer of high concentration ozone with high efficiency injectors and degassing separators, International Ozone Association Pan American Group 1995 Annual Conference, Nov. 1995, 15p.

Micheal Meisser, Resonant Behaviour of Pulse Generators for the Efficient Drive of Optical Radiation Sources Based on Dielectric Barrier Discharges, Jul. 2013, 210p.

Davod B. Miklos et al., Evaluation of advanced oxidation processes for water and wastewater treatment e a critical review, Water Research, 118-131, 139.

Jefferson Morrilla Esparza et al., Combined treatment using ozone for cyanide removal from wastewater: a comparison, Aug. 2018, Revista internacional de contaminación Ambiental, 459-467, 35-2.

Thomas Oppenlander et al., Mercury-free Vacuum-(VUV) and UV Excilamps: Lamps pf the Future, IUVA News, Jan. 2005, 16-20, 7-4.

Sebastien Ryskie et al., Efficiency of ozone microbubbles for ammonia removal from mine effluents, Minerals Engineering, Oct. 2019, 8p., 145.

M. Sanchez-Polo et al., Combination of Ozone with Activated Carbon as an Alternative to Conventional Advanced Oxidation Processes, Ozone Science and Engineering, Aug. 2006, 237-245, 28.

Martin Sorensen et al., CyanoMat®—Modern Cyanide Treatment by UV-Oxidation Practical Examples from Installations, Galvanotechnik, Oct. 2001, 12p. , vol. 92, No. 10.

J. L. Sotelo et al., Henry's law constant for the ozone-water system, Water Research, Mar. 1989, 1239-1246, 23-130–.

B.A Tsybikova et al., Photochemical oxidation of priority ecotoxicants of gold mill Wastewater, IOP Conference Series: Materials Science and Engineering, Dec. 2018, 6p., 451-1.

I. Udrea et al., Catalytic oxidation of SCN and CN ions from aqueous solutions, Environmental Technology, Jun. 2004, 1131-1141, 25-10.

Peter J. Vikesland et al., Monochloramine decay in model and distribution system waters, Water Research, Jul. 2000, 1766-1776, 35-7.

Ran Yin et al., Wavelength-dependent chlorine photolysis and subsequent radical production using UV-LEDs as light sources, Water Research, Jun. 2018, 452-458, 142.

Zeynep B. Guzel-Seydim et al., Use of ozone in the food industry, Lebensmittel-Wissenschaft und-Technologie, Oct. 2003, 453-460, 37.

PCT search report for PCT application PCT/IB2022/052680, from which the present application is a national phase of, issued Jun. 16, 2022.

PCT written opinion of the ISA for PCT application PCT/IB2022/052680, from which the present application is a national phase of, issued Jun. 16, 2022.

Abstract of JP2005246109 to Miki et al. published Sep. 15, 2005 : Note, only the abstract is known to the applicant.

Khuntia S. et al., Removal of Ammonia from Water by Ozone Microbubbles, Dec. 2012, Ind. Eng. Chem. Res. 2013, 52, 318-326.

Automated translation of Chine Patent literature document CN104261625B, cited above.

Automated translation of Chine Patent literature document CN106242191A, cited above.

Automated translation of Chine Patent literature document CN109553211A, cited above.

(56) References Cited

OTHER PUBLICATIONS

Automated translation of Chine Patent literature document CN104086053A, cited above.

* cited by examiner

OZONE TREATMENT OF MINING EFFLUENTS

FIELD OF THE INVENTION

The present invention relates generally to the field of mining. More specifically, the present invention is concerned with the ozone treatment of mining effluents.

BACKGROUND OF THE INVENTION

Due to the use of nitrogen-based explosives, as well as the use of the cyanidation process, nitrogen species (ammoniacal nitrogen ($NH_3$—N) and nitrite ($NO_2$)) and cyanide species (thiocyanate (SCN), cyanide (CN), weak acid dissociable cyanide (WAD CN—) and cyanate (CNO)) are commonly found in gold mining effluents, and other effluents, such as in water from mining operations relying on cyanide solutions used to extract precious metals such as gold and silver. Nitrogen-based explosive can also contribute to the presences of these contaminants in other effluents. Currently, the Best Available Technology Economically Achievable (BATEA) to treat these contaminants in mining effluents is biological oxidation. However, this approach can be quite challenging in cold climates, with low water temperature that considerably reduces the process efficiency and increases the start-up time and the required reactor volume. Furthermore, biological oxidation can be inhibited in presence of other contaminant found in the mining effluents, such as copper, and if the concentration of contaminants to be treated is too high.

Against this background, there exists a need in the industry to provide novel methods and devices to treat mining effluents.

An object of the present invention is therefore to provide such methods and devices.

SUMMARY OF THE INVENTION

In a broad aspect, there is provided a method of treating mining effluents containing at least one of nitrogen and cyanide species, the method comprising injecting ozone in the mining effluent.

In another broad aspect, there is provided a method of treating mining effluents, the method comprising: providing mining effluents containing at least one nitrogenated compound selected from the contaminant group consisting of: ammoniacal nitrogen, nitrite ions, nitrate ions, thiocyanate ions, weak acid dissociable cyanide ions, cyanide ions and cyanate ions; performing a first ozone treatment on the mining effluents; and performing a second ozone treatment on the mining effluents after the first ozone treatment; wherein the first and second ozone treatments are performed respectively at first and second pH that differ from each other; wherein the first and second treatments together reduce a concentration of the at least one nitrogenated compound in the mining effluents.

Providing the mining effluent may include pumping mining effluents from a tailing pond, or providing the mining effluents in any other suitable manner to a processing unit.

There may also be provided a method wherein the first and second ozone treatments together reduce a total concentration of all the nitrogenated compound from the contaminant group present in the mining effluent.

There may also be provided a method wherein the second ozone treatment is performed at a higher pH than the first ozone treatment.

There may also be provided a method further comprising adding an alkaline chemical to the mining effluent between the first and second treatments.

There may also be provided a method further comprising wherein the alkaline chemical product is selected from the group consisting of NaOH and lime.

There may also be provided a method wherein the first pH is from 6.5 to 8.5.

There may also be provided a method wherein the first pH is from 7.0 to 8.0.

There may also be provided a method wherein the second pH is from 8.5 to 10.5.

There may also be provided a method wherein the second pH is from 9 to 10.

There may also be provided a method wherein the mining effluent contain both ammoniacal nitrogen and at least one cyanide species selected from the group consisting of thiocyanate ions, weak acid dissociable cyanide ions, cyanide ions and cyanate ions.

There may also be provided a method wherein at least 0.2 g/L of ozone is added to the mining effluent during at least of one of the first and second ozone treatments.

There may also be provided a method wherein at least 1 g/L of ozone is added to the mining effluent during at least of one of the first and second ozone treatments.

There may also be provided a method further comprising softening the mining effluent after the first ozone treatment.

There may also be provided a method wherein softening is performed by adding lime to the mining effluent.

There may also be provided a method wherein the first and second ozone treatments are performed at a temperature lower than 5° C.

There may also be provided a method wherein the first and second ozone treatments are performed at a temperature of 1° C. or lower.

There may also be provided a method further comprising, after the second ozone treatment, at least one of: lowering a pH of the mining effluent; removing dissolved metal in the mining effluent; removing suspended solids in the mining effluent.

There may also be provided a method further comprising reducing an alkalinity of the mining effluent prior to at least one of the first and second ozone treatments.

There may also be provided a method wherein reducing the alkalinity is performed by lowering the pH of the mining effluent, for example to 4 or less.

There may also be provided a method further comprising adding a base to the mining effluent while at least one of the first and second ozone treatments is performed to maintain the mining effluent within a predetermined pH range.

There may also be provided a method further comprising adding bromide in the mining effluents.

There may also be provided a method wherein the bromide is added after completion of the first ozone treatment.

In yet another broad aspect, there is provided a method of treating mining effluents, the method comprising: providing mining effluents containing at least one nitrogenated compound selected from the contaminant group consisting of: ammoniacal nitrogen, nitrite ions, nitrate ions, thiocyanate ions, weak acid dissociable cyanide ions, cyanide ions and cyanate ions; and treating the mining effluents simultaneously with bromide ions and ozone to reduce a concentration of the nitrogenated compound.

Advantageously, the proposed methods may achieve in some embodiments less than 20% loss of the ozone injected in the mining effluents and require relatively small amounts of catalysts when such catalysts are used. In other embodiments, no catalyst is used and variations in pH are used to target specific species to eliminate. The method is relatively efficient and can be performed at relatively low costs and is able, in some embodiments, to meet industry standards for the treated effluents, for example be in compliance with the Metal Mining and Diamond Mining Effluent Regulations (MDMER, 2018) and other similar regulations.

In yet another broad aspect, there is provided a method of treating mining effluents, the method comprising: providing mining effluents containing cyanate ions; performing an ozone treatment on the mining effluents by injecting ozone in the mining effluents, wherein the ozone treatment is performed at a pH of 8.5 or less and wherein the ozone treatment reduces a concentration of the cyanate ions in the mining effluents.

There may also be provided a method wherein wherein the pH is between 7.0 and 8.0.

Other specific embodiments of this last method may use the parameters of the first ozone treatment recited above.

It has been found that while cyanate removal with ozone has been discussed in the literature, such removal is usually performed at higher pH levels. It was found that surprisingly, cyanate removal under at least some of the conditions described for the first ozone treatment in the present document may be successful in effectively removing cyanate ions from mining effluents.

Other objects, advantages and features of the present invention will become more apparent upon reading of the following non-restrictive description of preferred embodiments thereof, given by way of example only with reference to the accompanying drawings.

DETAILED DESCRIPTION

Figure 1:
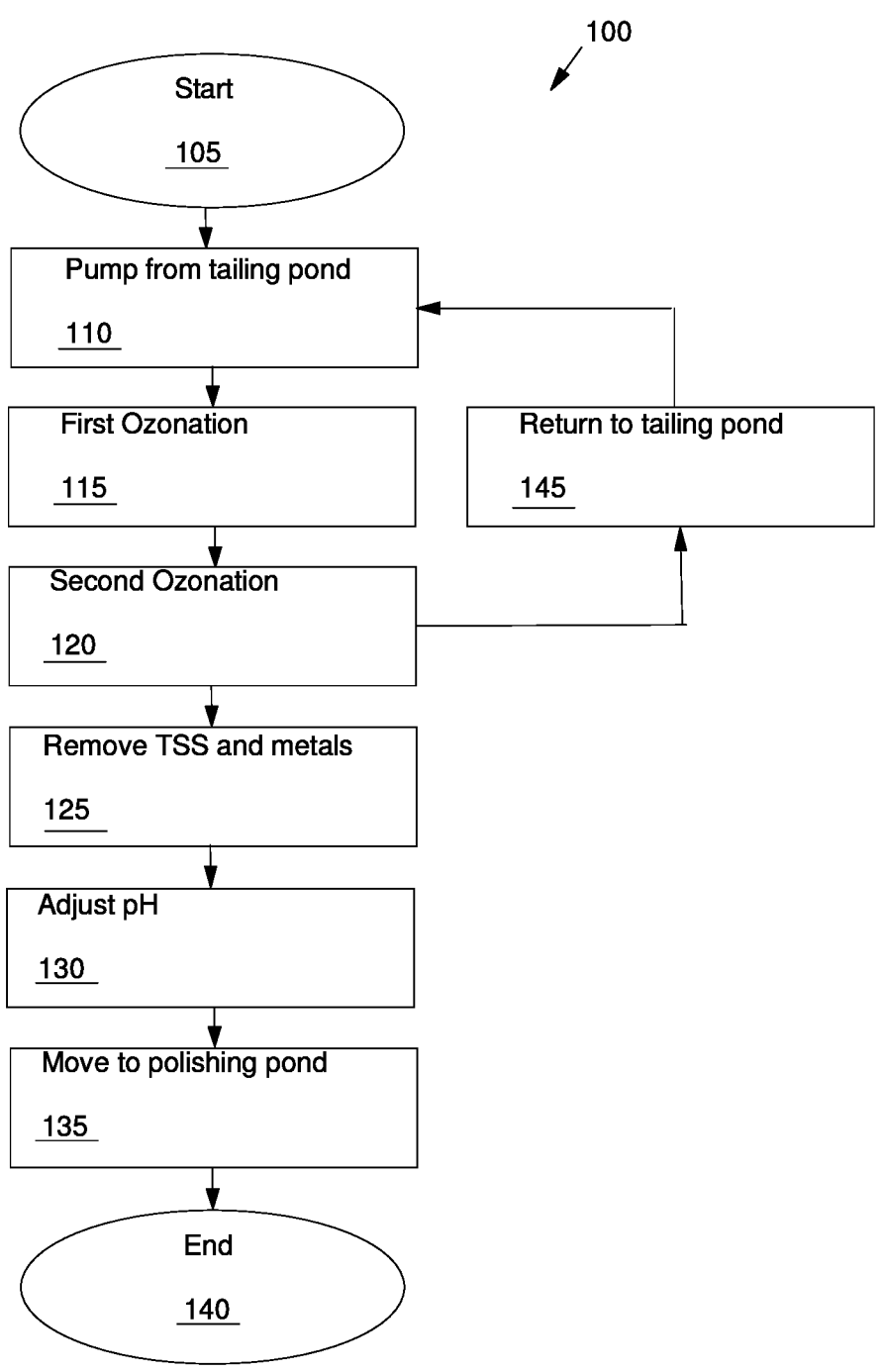
FIG. 1, in a flowchart, illustrates a method for treating mining effluents in accordance with an embodiment of the present invention.

FIG. 1 illustrates a method 100 of treating mining effluents containing at least one of ammoniacal nitrogen and cyanide species in accordance with an embodiment of the present invention. For example, the method may treat mining effluents containing at least one of ammoniacal nitrogen (ammonia/ammonium (NH3/NH4+)), nitrite ($NO_2$—), nitrate ($NO_3$—) thiocyanate (SCN—), cyanate (CNO—) and cyanide (CN—). Such effluents are typically stored in a tailing pond before processing, but the method may be used in effluents that are not coming from a tailing pond.

The method 100 starts at step 105. Then, at step 110, the effluents to treat are pumped from the tailing pond or introduced in any other manner in the processing plant. Treatment is for example performed using a batch process, although a continuous process could be implemented in alternative embodiments. Then, at steps 115 and 120, successive ozone treatments are performed. The two treatments are performed under two different conditions. For example, the two different conditions include performing ozonation at two different pH levels. For example, and non-limitingly, step 110 is performed at a pH of around 7.5+/−1.0 or at a pH of around 7.5+/−0.5, and, after addition of a base such as NaOH, step 115 is performed at a pH of around 9.5+/−1.0 or at a pH of around 9.5+/−0.5. In another example, the two different conditions include treatment with ozone alone first, followed with concomitant treatment with ozone and bromide ions afterwards.

Subsequently, the resulting treated water is subject to a total suspended solids (TSS) and metal removal step 125, followed by a pH adjustment step 130 by addition for example of sulphuric acid, and transfer to a polishing pond at step 135, after which the method stops at step 140. In some embodiments, after step 120, some or all of the water is transferred back to the tailing pond at step 145 so that the water can be further treated or stored onsite and reused. Step 145 may be performed systematically, or when testing after step 120 shows that further treatment is required before step 125 is performed. Steps 125, 130 and 135 may be performed in conventional ways and are therefore not further described. However, in alternative embodiments, steps 125, 130 and 135 may be performed in non-conventional ways. Also, in some embodiments, step 145 is completely omitted.

In an alternative embodiment, the method 100 is modified through the addition of a water softening step, for example using lime, between steps 115 and 120. In another alternative embodiment, a single ozone treatment, step 115, in the presence of bromine in the form of bromide ions is performed, instead of the two successive ozone treatments steps 115 and 120. Therefore, in these embodiments, step 120 is omitted. In another alternative embodiment, only the second ozonation step 120 is modified so that both ozone and bromide are used simultaneously in step 120.

Example 1

Pilot Unit

Figure 2:
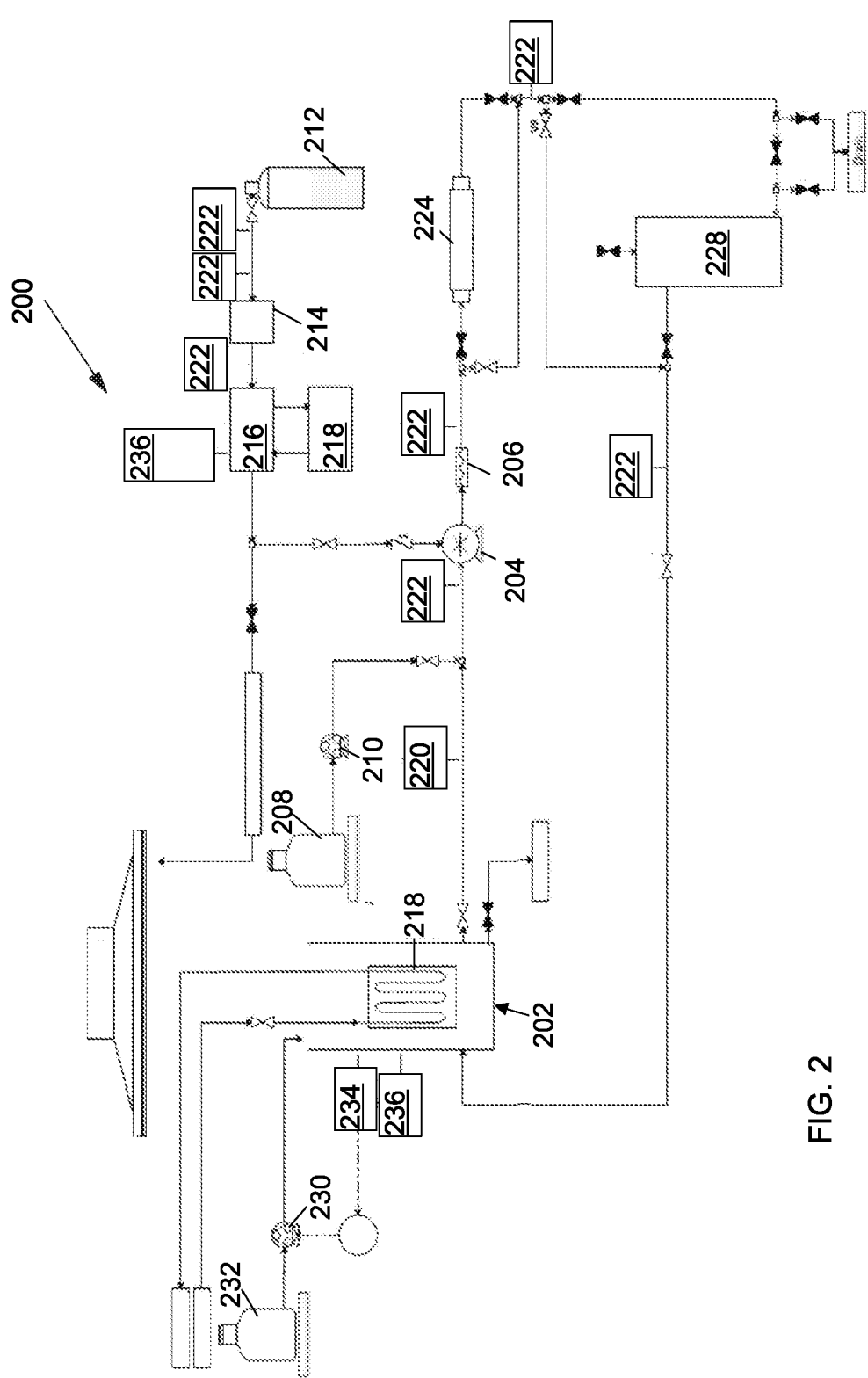
FIG. 2, in a schematic view, illustrates a pilot unit used to assess the performance of the process of FIG. 1 and of variations thereon.

FIG. 2 illustrates a pilot unit 200 that was used to perform part of the proposed method 100, and its alternative embodiments, at laboratory scale, and more specifically, steps 115 and 120, to better assess its performance. While this pilot unit 200 performed treatments at a relatively small scale, this pilot unit 200 can be scaled up to perform treatment at an industrial scale with suitable modifications.

The pilot unit 200 was operated in a batch process with continuous recirculation during the whole process. Water to treat was recirculated in a recirculation loop until the targeted quality parameters were reached. The pilot unit 200 has been designed to allow operational flexibility. Therefore, it was possible to change the flow path using valve sets. The following paths were possible.

The first flow path is the main recirculation loop. It includes a recirculation reactor 202 feeding a microbubble pump 204, which itself feeds the water in a static mixer 206. If desired, a catalyst can be injected also in this flow leading to the microbubble pump 204 from a tank 208 using a dosing pump 210. The microbubble pump 204 is used to inject ozone in the treated water. Ozone is produces in-situ from an oxygen cylinder 212 feeding, though air filters 214 an ozone generator 216 chilled by an ozone generator chiller 218, and the ozone thus generated is sent to the microbubble pump 204. The recirculation reactor 202 is temperature controlled using a recirculation reactor chiller 218. For example, in a specific embodiment, ozone can be injected at about 5 to 27 g/hr at concentration from 3% to 20% w/w. In the main recirculation loop, water coming from the static mixer 206 is fed back to the recirculation reactor 202. Flow through the recirculation loop can be characterized using a flow meter 220 and manometers 222.

The second flow path (first bypass) circulates the water through an UV lamp 224 downstream of the static mixer 206 before returning to the recirculation reactor 202. This loop can be selectively opened and closed through suitably positioned valves. In this setup, the UV lamp 204 can be operated at more than one intensity.

The third flow path (second bypass) circulates the water through an heterogeneous catalysis column 228 downstream of the static mixer 206 or of the first bypass. The second bypass can be selectively opened and closed through suitably positioned valves. This third flow path was used to test heterogeneous catalysis (using a packed heterogeneous catalysis column 228) as well as the effect of added hydraulic retention time (HRT) trial (using an empty heterogeneous catalysis column 228). Passage through each of the first and second flow bypasses can be independently performed, as well as passage through both bypasses.

Control of pH in the recirculation reactor 202 was performed using a dosing pump 230. The dosing pump 230 fed from a tank 232 and had an integrated controller with proportional control mode allowing the input of a set point. The pumping frequency was automatically adjusted to reach and maintain any target pH value. The reading was done by a pH meter 234 which is submerged in the recirculation reactor 202. The recirculation reactor chiller 218 took the form of a stainless-steel coil immersed in the recirculation reactor 202. Tap water was fed into the coil at a constant flow rate. A temperature of 20±1° C. was maintained throughout most tests, but other temperatures have also been used. Monitoring of the temperature in the recirculation tank 202 can be performed using a thermometer 236.

Produced onsite as a gas, ozone needs to be dissolved in water to react with targeted contaminants. Also, since ozone production is typically the most expensive component of an ozonation system, efficient ozone dissolution and utilization is helpful in lowering the cost of operation of such processes. Ozone was typically added continuously for the whole duration of the process.

When treating nitrogenous-based contaminants in mine water, the following reactions can be expected $$SCN^-+O_3+H_2O \rightarrow SO_4^{2-}+HCN+H^+ \tag{1}$$

$$CN^-+O_3 \rightarrow CNO^-+O_2 \tag{2}$$

$$CNO^-+O_3+2\ H_2O \rightarrow NH_3+HCO_3^-+1.5O_2 \tag{3}$$

$$NH_3+3O_3 \rightarrow NO2-+3O_2+H^++H_2O \tag{4}$$

$$NO_2^-+O_3 \rightarrow NO3-+O_2 \tag{5}$$

By rearranging equations (1) to (5), and by assuming that the contribution of the other oxidable compounds in mine water are negligible, the stoichiometric ozone demand to obtain a given removal of nitrogen-based contaminants can be expressed as in equation (6), with WAD representing Weak Acid Dissociable:

$$mg\ O_3/L = A(\Delta SCN) + B(\Delta SCN + \Delta WAD\ CN) + C \\ (\Delta SCN + \Delta WAD\ CN + \Delta CNO) + D(\Delta SCN + \Delta WAD \\ CN + \Delta CNO + \Delta NH_3) \tag{6}$$

where

"$\Delta$" represents the difference between the concentration of a species in the influent and the effluent, expressed in mg N/L.

"A" represents the stoichiometric ratio $O_3$:SCN—N, as per Equation 1, expressed in mg (3.4 mg $O_3$:mg SCN—N).

"B" represents the stoichiometric ratio $O_3$:WAD CN—N, as per Equation 2, expressed in mg (3.4 mg $O_3$:mg WAD CN—N).

"C" represents the stoichiometric ratio $O_3$:CNO—N, as per Equation 3, expressed in mg (3.4 mg $O_3$:mg CNO—N).

"D" represents the stoichiometric ratio O3:NH3-N, as per Equations 4 and 5, expressed in mg (13.7 mg $O_3$:mg $NH_3$—N).

Thus, by measuring the SCN—, WAD CN—, CNO—, and $NH_3$—N concentrations in the influent and the effluent, as well as recording the applied ozone injection rate during these trials, the Ozone Utilization Efficiency (OUE) is calculated using the equation (7):

$$\text{OUE (\%)}=100*\text{(theoretical stoichiometric demand)}/\text{(applied injection rate)} \quad (7)$$

A significant number of trials were carried out where ammoniacal nitrogen was the only contaminant in the water. To be able to compare the treatment efficiency of these trials rapidly, the Ozone to Ammonia Ratio (OAR) was used:

$$\text{OAR}=\dot{m}_{ozone}*(t_{trial}/t_{basis})/(\Delta NH_3\ V) \quad (8)$$

Where:

"$\dot{m}_{ozone}$" represents ozone mass injection rate, expressed in $mgO_3$/h.

"$t_{trial}$" represents the trial time, expressed in minutes.

"$t_{basis}$" represents the trial time basis, expressed in minutes (60 min).

"$\Delta NH3$" represents the difference between the concentration of ammonia at t=0 and $t_{final}$, expressed in mg NH3-N.

"V" represents the volume of water, expressed in L.

This ratio does not take into consideration other oxidable compounds. Thus, higher OAR is expected in presence of cyanide and cyanide related compounds. Also, note that final ammonia concentration varied between tests. The value closest to 5 mg NH3-N/L and its corresponding final time ($t_{final}$) were used to make the calculation. Also, the total water volume of the trial depends on the flow path and the equipment used. Volumes were measured manually and are presented in Table 1.

TABLE 1

Volume of water in pilot plant of FIG. 2 for different setups.

| Flow path | Description | Equipment | Volume |
|---|---|---|---|
| 1 | Recirculation loop | — | 18 L |
| 2 | Recirculation loop with bypass 1 | UV lamp 224 at high intensity | 21 L |
| 2 | Recirculation loop with bypass 1 | UUV lamp 224 at low intensity | 20.5 L |
| 3 | Recirculation loop with bypass 2 | Empty reactor 228 | 51 L |
| 3 | Recirculation loop with bypass 2 | Packed reactor 228 | 30 L |

Raw Water Characterization

Many tests were performed using samples having different compositions. To meet the need for the trials, some waters were spiked with contaminants. The type of water, the nomenclature, and the spiked contaminants (in addition to what could have been in the sample) are presented in Table 2.

TABLE 2

Raw water samples used in the tests described below

| Water | Contaminant Spiked | Nomenclature |
|---|---|---|
| Synthetic water | 50 mg NH3—N/L | SE |
| Synthetic water + Cyanate | 50 mg NH3—N/L and 50 mg CNO—N/L | SE + CNO |
| Underground water from Mine 1 | 50 mg NH3—N/L | UG |

TABLE 2-continued

Raw water samples used in the tests described below

| Water | Contaminant Spiked | Nomenclature |
|---|---|---|
| Tailing water from Mine 1 | 50 mg NH3—N/L | B2a |
| Tailing water from Mine 1 | 50 mg CNO—N/L | B2b |
| Underground water from Mine 2 | 50 mg NH3—N/L | LZ5 |
| Tailing water from Mine 2 | No | B1 |

A sample for each raw water was sent to an external laboratory for complete characterization.

Process Reproducibility and Baseline Trials

Before proceeding with the parametric study, reproducibility of treatment in the pilot unit 200 was assessed. To do so, several trials were performed on SE samples at identical conditions, otherwise referred as "baseline trials": pH 9.5, 18 L sample; 20° C.; 16.5 g $O_3$/h injection; 18.5 L/min flow rate in the recirculation loop; 1.6 seconds of retention time in the recirculation loop; 60 PSI in the recirculation loop.

Figure 3:
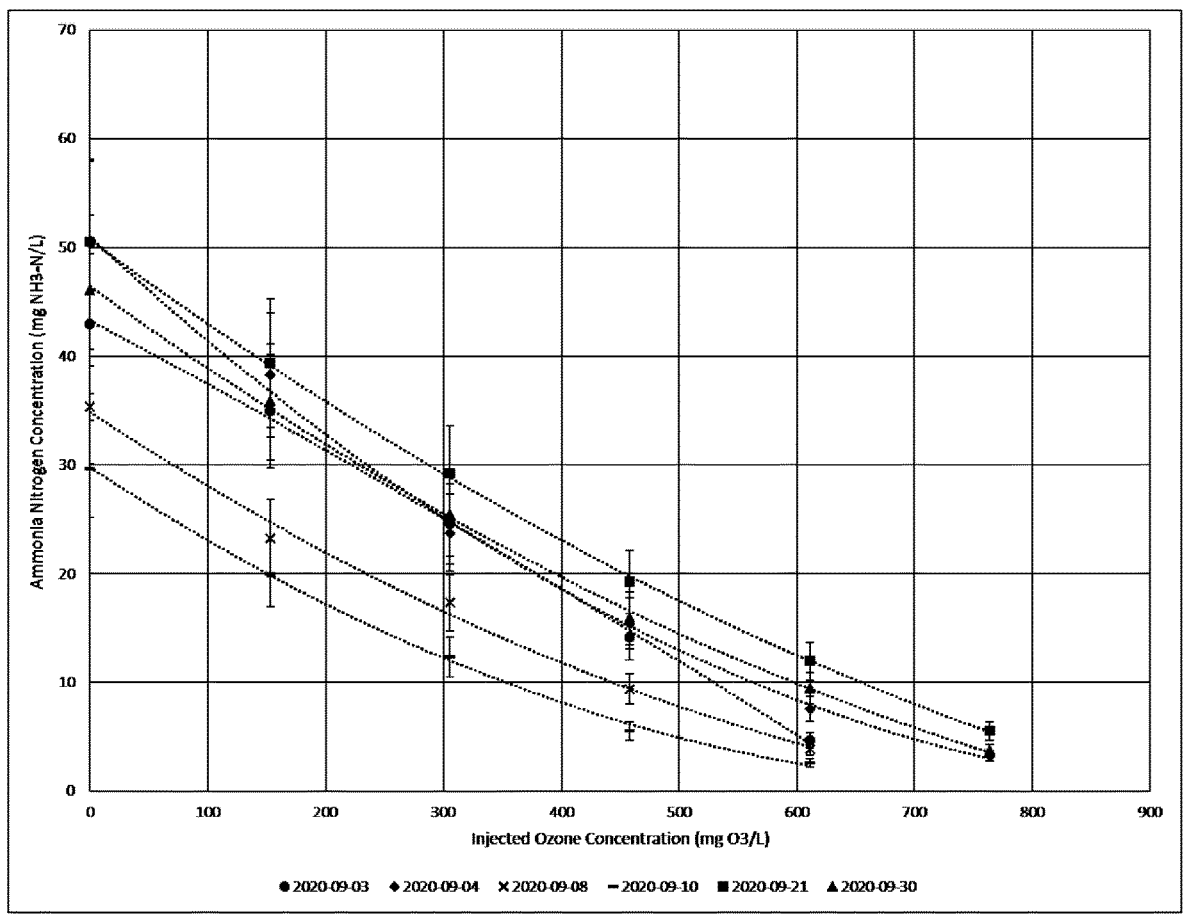
FIG. 3, in an X-Y graph, illustrates baseline trials obtained with the pilot unit of FIG. 2 performed on "SE" samples as detailed below.
Figure 4:
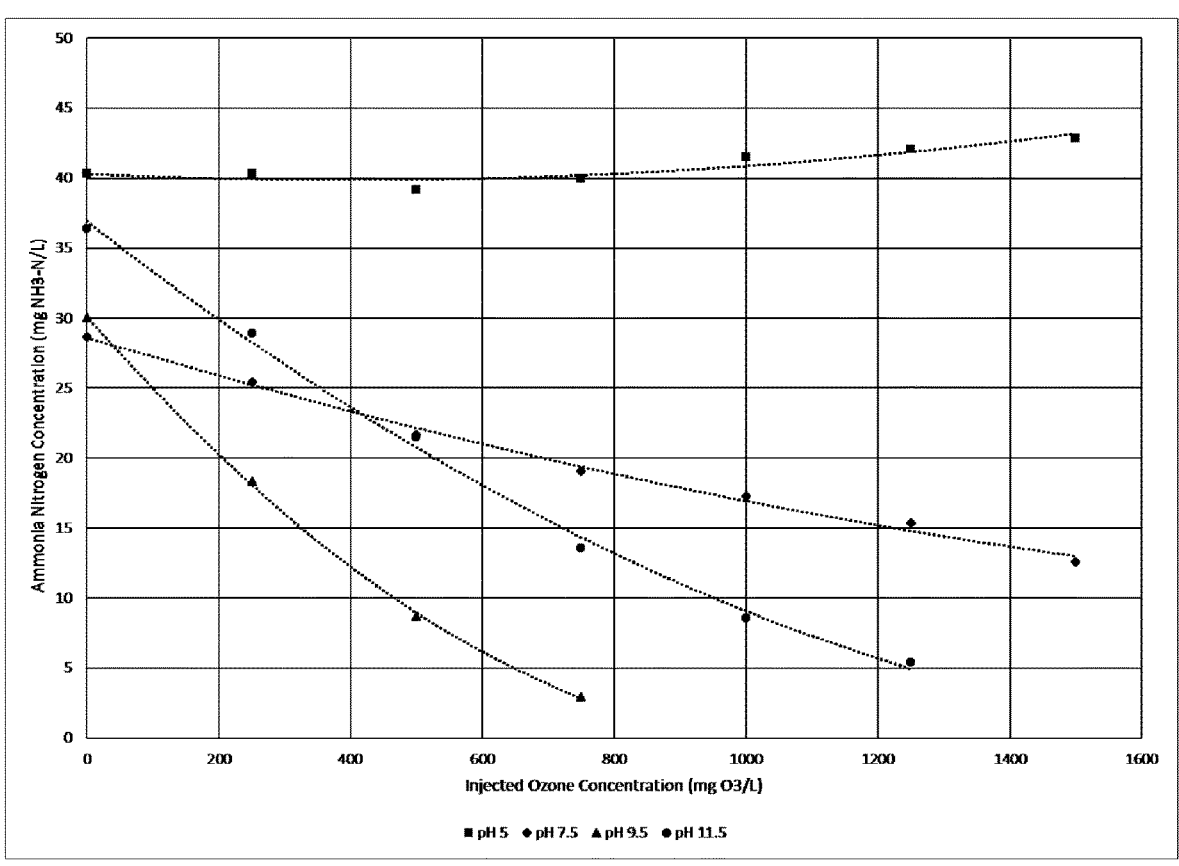
FIG. 4, in an X-Y graph, illustrates the impact of pH on ozone requirements for the pilot unit of FIG. 2.
Figure 5:
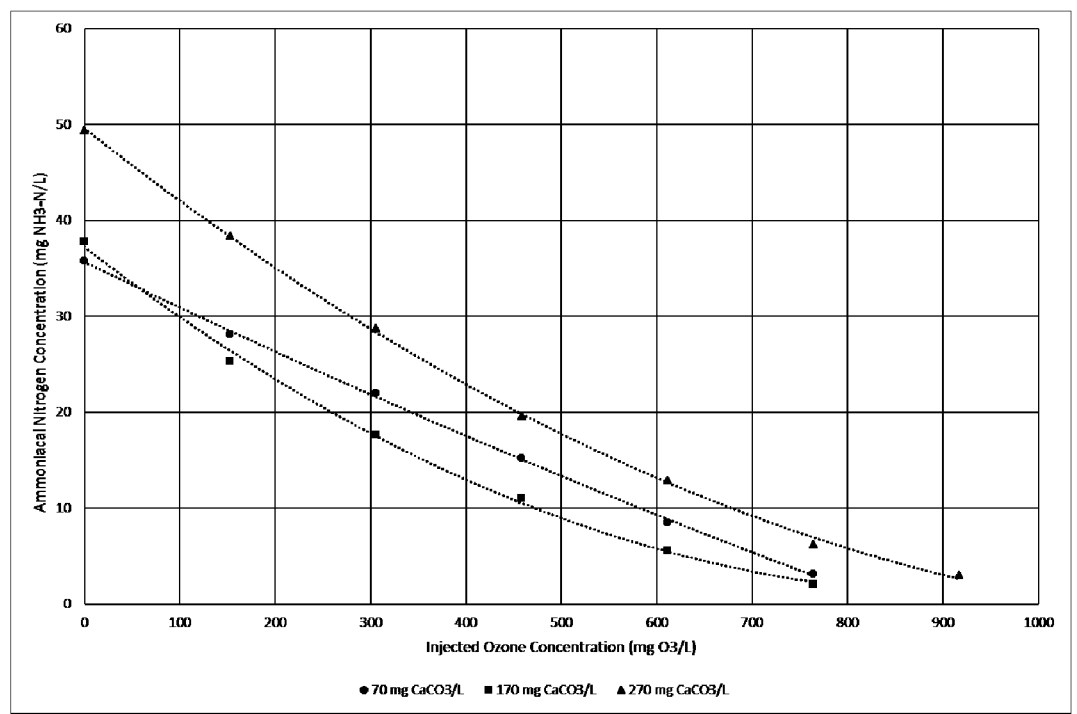
FIG. 5, in an X-Y graph, illustrates the impact of alkalinity on ozone requirements for the pilot unit of FIG. 2.
Figure 6:
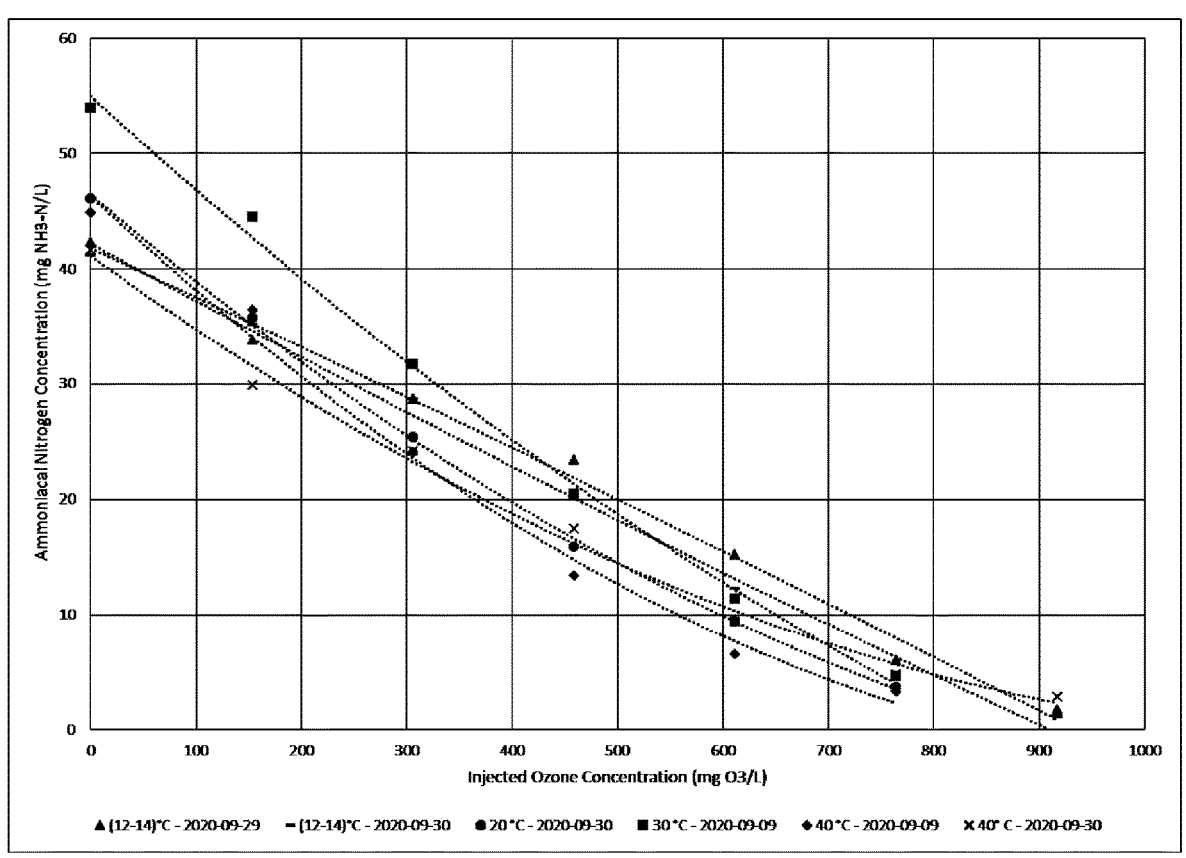
FIG. 6, in an X-Y graph, illustrates the impact of temperature on ozone requirements for the pilot unit of FIG. 2.
Figure 7:
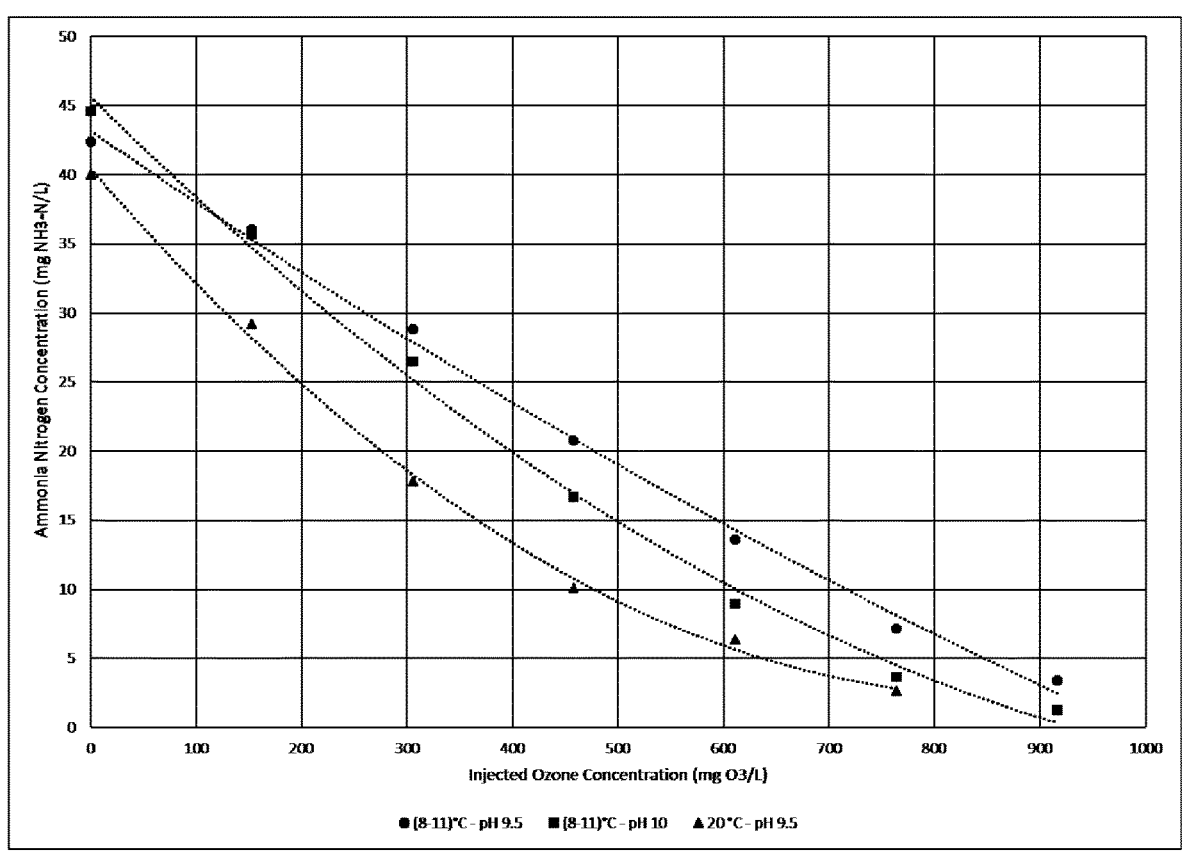
FIG. 7, in an X-Y graph, illustrates the impact of temperature and pH on ozone requirements for the pilot unit of FIG. 2.
Figure 8:
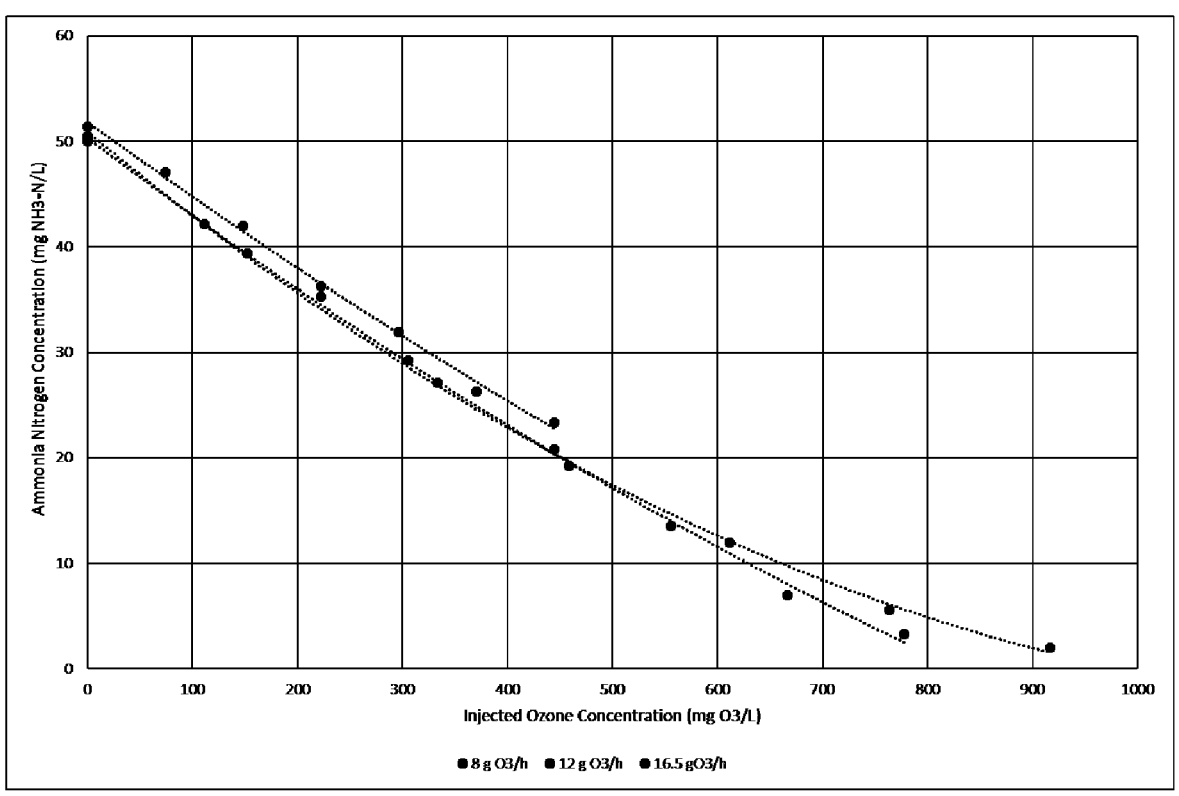
FIG. 8, in an X-Y graph, illustrates the impact of ozone injection rate on ozone requirements for the pilot unit of FIG. 2.
Figure 9:
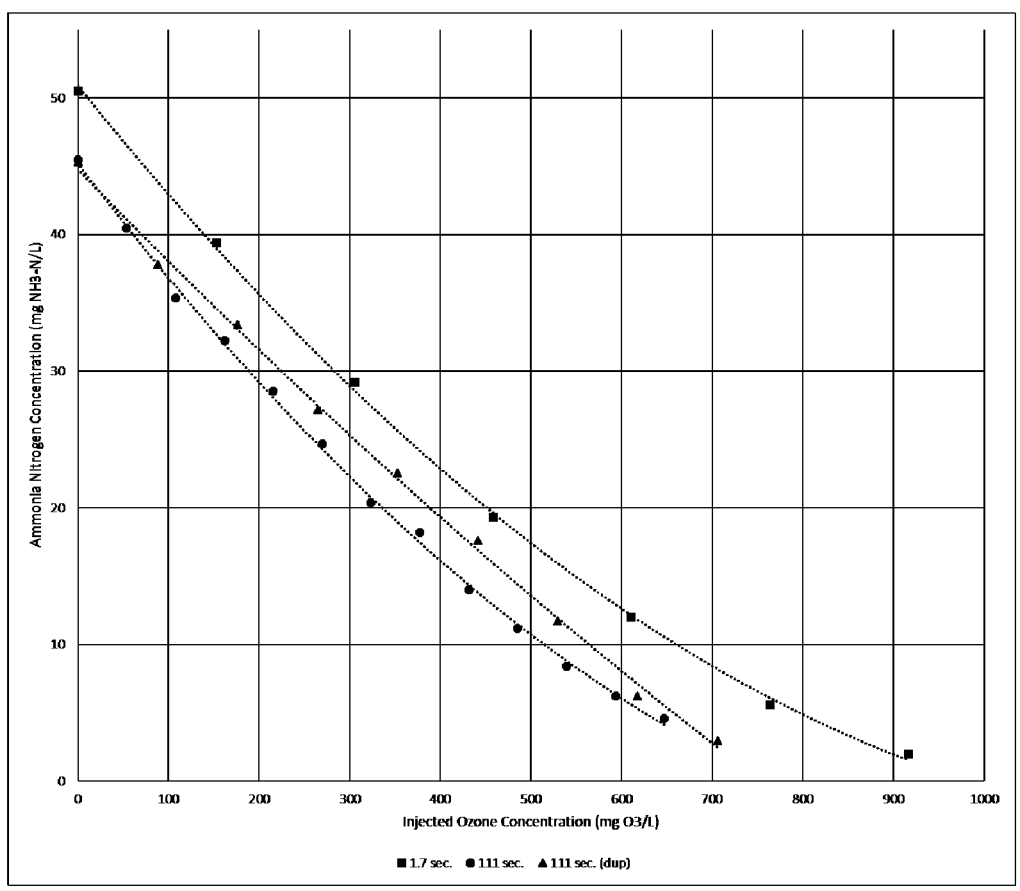
FIG. 9, in an X-Y graph, illustrates the impact of hydraulic retention time on ozone requirements for the pilot unit of FIG. 2.
Figure 10:
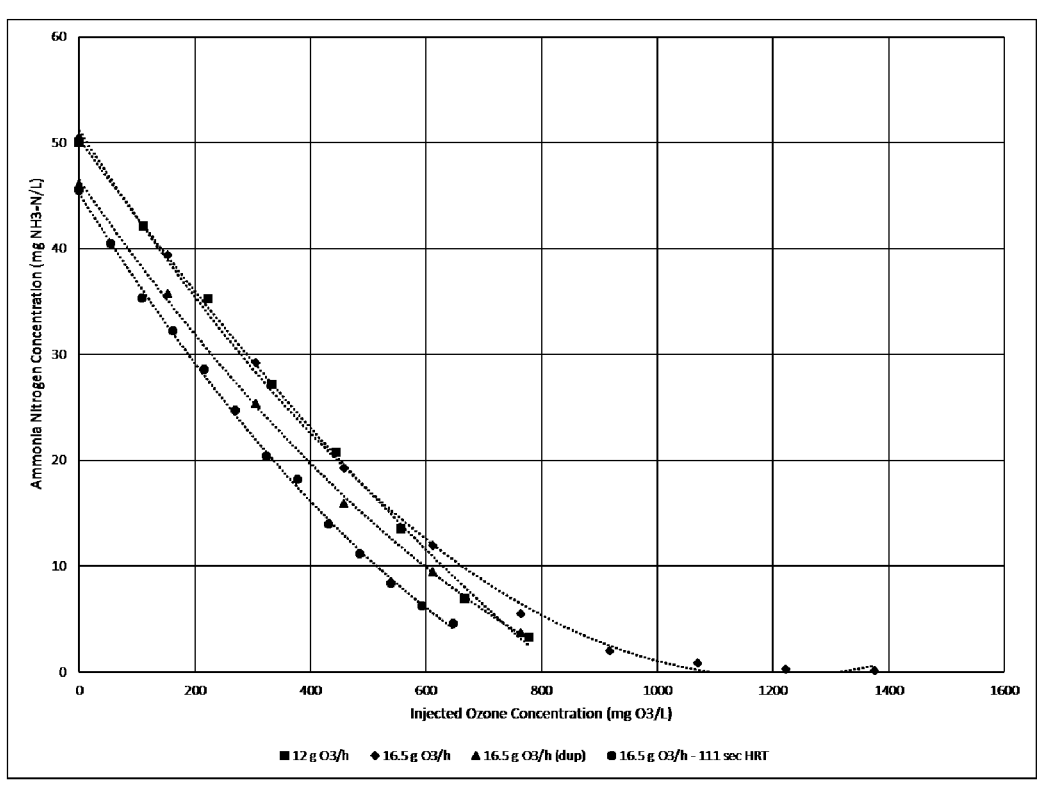
FIG. 10, in an X-Y graph, illustrates the impact of final ammoniacal nitrogen concentration on ozone requirements for the pilot unit of FIG. 2.
Figure 11:
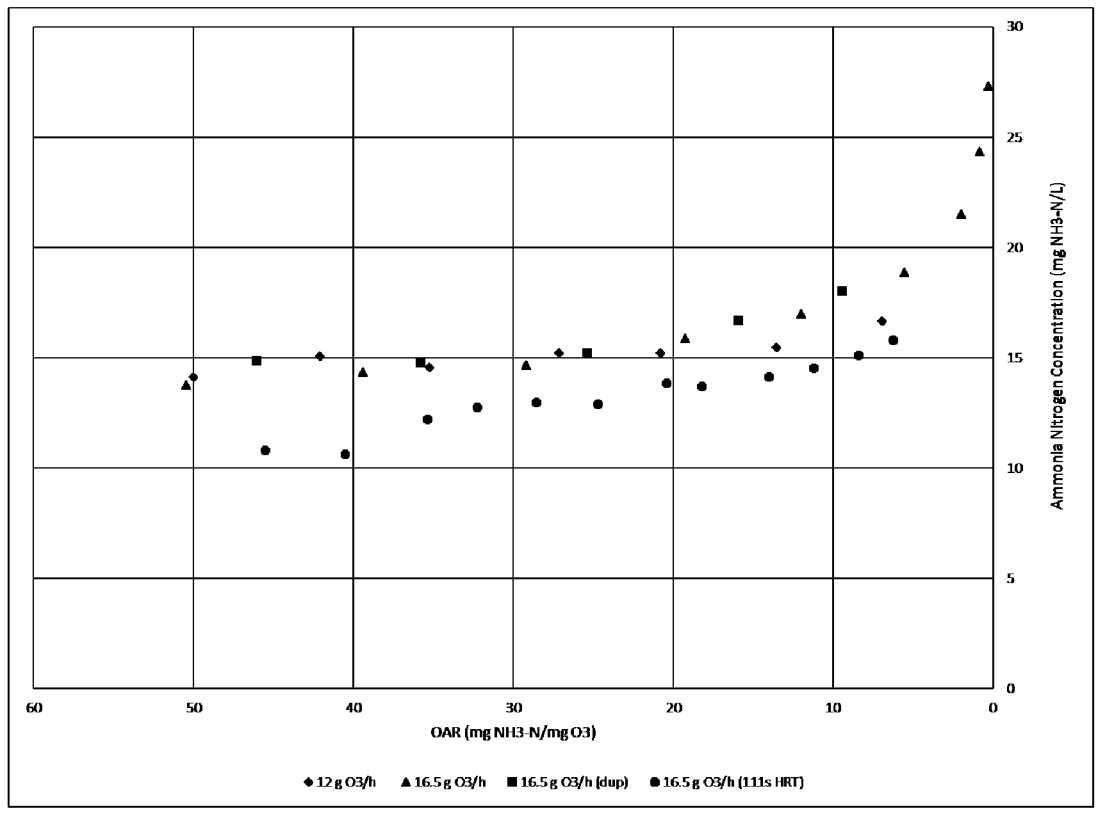
FIG. 11, in an X-Y graph, illustrates the impact of final ammoniacal nitrogen concentration on the OAR for the pilot unit of FIG. 2.

Results from these trials are presented in FIG. 3 and Table 3. In FIGS. 3 to 21, injected ozone concentration is a proxy for time as we know the injection rate. Normalization of time to ozone injection allows comparison between trials. These results highlight that even if all parameters are constant, a variation in the system response can be expected. The OAR observed was about 17±2 mg $O_3$/mg NH3—N and the OUE was about 81±11%. This variation is expected to be the sum of the uncertainty on several components of the system (ammonia selective electrode, pH probe, ozone generator, pressure sensor, flowmeter, measurement delays, etc.).

Among these uncertainties, the accuracy of the ammonia selective electrode was identified as a primary factor. Indeed, all trials presented in FIG. 3 were performed on the same SE, with an expected initial concentration of 50 mg NH3—N/L. Attempts were made to corroborate the readings of this probe with colorimetric method (Hach spectrophotometer DR3900, Method 10031), but the results obtained from that method were also imprecise.

Furthermore, this imprecision appears to be most noticeable on trials which started (T0) at concentrations below 40 mg NH3—N/L. The OAR and OUE of these trials were considerably lower than the other trials. So, to mitigate this imprecision, it was decided to reject as much as possible results from trials that started below 40 mg NH3—N/L.

Finally, the interpretation of the results generated below has been made in accordance with this finding. These findings also raise doubt about the conclusions of several publications that fail to clarify the imprecision of the system used and then represent their ammonia concentration on the y-axis as $t/t_0$ (concentration at time t divides by concentration at time zero).

TABLE 3

OAR and OUE Results of Baseline Trials Performed on SE Samples

| Date | Trial | OAR (mg O3/ mg NH3—N) | OUE (%) |
|---|---|---|---|
| 2020 Sep. 3 | Trial 1-Ozone pH 9.5 | 16.0 | 85.9 |
| 2020 Sep. 4 | Trial 2-Ozone pH 9.5 | 16.2 | 84.5 |
| 2020 Sep. 8 | Trial 3-Ozone pH 9.5 | 19.4 | 70.6 |

TABLE 3-continued

| | OAR and OUE Results of Baseline Trials Performed on SE Samples | | |
| --- | --- | --- | --- |
| Date | Trial | OAR (mg O3/ mg NH3—N) | OUE (%) |
| 2020 Sep. 10 | Trial 4-Ozone pH 9.5 | 19.0 | 72.1 |
| 2020 Sep. 21 | Trial 5-Ozone pH 9.5 | 17.0 | 80.6 |
| 2020 Sep. 30 | Trial 6-Ozone pH 9.5 | 18.0 | 76.0 |

Impact of Process Parameters pH pH influences elimination of ammoniacal nitrogen. Results from trials performed to assess this influence are presented in FIG. 4. The best OAR and OUE results were observed at pH 9.5. But, even at that pH, the OAR and OUE observed were considered very low as presented in FIG. 4 and Table 4. After further investigation, a leak on the ozone feed line was found. This leak was fixed on the morning of 2020 Sep. 3, and the OAR and OUE results obtained after this intervention were found to be much closer to what was expected.

TABLE 4

| | OAR and OUE of pH Trials | | |
| --- | --- | --- | --- |
| Date | Trial | OAR (mg $O_3$/ mg $NH_3$—N) | OUE (%) |
| 2020 Sep. 2 | Ozone pH 5 | N/A | N/A |
| 2020 Sep. 2 | Ozone pH 7.5 | 93.1 | 14.7 |
| 2020 Sep. 2 | Ozone pH 9.5 | 27.6 | 49.6 |
| 2020 Sep. 2 | Ozone pH 11.5 | 40.3 | 34.0 |

Alkalinity

The influence of alkalinity was assessed in a range close to the alkalinity of the SE sample (190 mg $CaCO_3$/L). The alkalinity of the water has been lowered by pre-treatment at pH 4. Results from these trials are presented in FIG. 5 and Table 5. It appears that lowering the initial alkalinity of this water does not have a considerable impact on the overall efficiency of the ozonation process. On the other hand, the trial at 290 mg $CaCO_3$/L yielded slightly worst results, even if its measured initial concentration in $NH_3$—N was higher. A higher measured ammonia concentration should yield slightly better results on SE water. Since this is not the case, we conclude that bicarbonate concentration in the hundreds of mg/L can impact the ozonation process.

TABLE 5

| | OAR and OUE of Alkalinity Trials | | |
| --- | --- | --- | --- |
| Date | Trial | OAR (mg $O_3$/ mg $NH_3$—N) | OUE (%) |
| 2020 Sep. 18 | Ozone 25 mg $CaCO_3$/L | 16.0 | 85.9 |
| 2020 Sep. 18 | Ozone 190 mg $CaCO_3$/L | 16.2 | 84.5 |
| 2020 Sep. 18 | Ozone 290 mg $CaCO_3$/L | 19.4 | 70.6 |

Temperature

Temperature has the potential to impact ozone efficiency in many ways. First, solubility of ozone decreases as the temperature of water increases, which may impact the mass transfer efficiency of an ozonation system. On the other hand, reaction kinetics increase with a temperature increase.

An increase in temperature favours the presence of union-ized ammonia, which is known to be more reactive with ozone than ionized ammonia. Since wide variations of temperature can be expected when treating mine water, we decided to perform additional trials on this parameter. A first set of results is presented in FIG. 6 and Table 6.

For the trial performed at 30° C., the temperature of the samples taken for ammoniacal nitrogen analysis was not adjusted to room temperature. Indeed, it was found shortly after this trial that adjusting the temperature of these samples was required to prevent erroneous reading with the selective probe. Without temperature adjustments, it was found that ammonia readings were higher than at room temperature. Nevertheless, results from the duplicate performed at 40° C. indicates that higher temperature does not negatively impact the ozonation process, i.e. the ozone mass transfer is not the limiting factor on the pilot unit.

As for the impact of lower temperature, the imprecision of the pilot system does not allow for any definite conclusion (because the OARs were close to each other). Nevertheless, trials performed between 12 and 14° C. appear slightly less efficient. To confirm these results, additional trials were performed, and their results are presented in FIG. 7 and Table 7. When comparing the OAR of the baseline trial (18.1 mg $O_3$/mg $NH_3$—N) with the OAR of the trial performed at temperature between 8 and 11° C. and pH 9.5 (23.5 mg $O_3$/mg $NH_3$—N), a slight decrease in the process efficiency can be once again observed. However, if the pH of the solution is maintained at 10 instead of 9.5, OAR similar to the baseline can be obtained. This seems to indicate that ionized ammonia speciation at lower temperature is favored and may be the cause of the decreased efficiency. In this case, an increase of the reaction pH could overcome this limitation.

TABLE 6

| | OAR and OUE of Temperature Trials | | |
| --- | --- | --- | --- |
| Date | Trial | OAR (mg $O_3$/ mg $NH_3$—N) | OUE (%) |
| 2020 Sep. 29 | 12 to 14° C. | 21.0 | 65.2 |
| 2020 Sep. 30 | 12 to 14° C. | 19.1 | 71.8 |
| 2020 Sep. 30 | 20° C. | 18.0 | 76.0 |
| 2020 Sep. 9 | 30° C. | 15.5 | 88.3 |
| 2020 Sep. 9 | 40° C. | 18.4 | 74.6 |
| 2020 Sep. 30 | 40° C. | 19.7 | 69.5 |

TABLE 7

| | OAR and OUE of Temperature and pH Trials | | |
| --- | --- | --- | --- |
| Date | Trial | OAR (mg $O_3$/mg $NH_3$—N) | OUE (%) |
| 2020 Oct. 29 | 20° C.-pH 9.5 | 18.1 | 75.5 |
| 2020 Oct. 29 | 8 to 11° C.-pH 9.5 | 23.5 | 58.3 |
| 2020 Oct. 29 | 8 to 11° C-pH 10.0 | 18.7 | 73.5 |

Ozone Injection Rate

One useful information would be the answer to the question is the ozone injection rate the limiting factor or is it the rate at which the oxidation of ammoniacal nitrogen happens? To answer this question, some trials at different ozone injection rate (variation of the ozone generator output) were performed. The results are presented in FIG. 8 and Table 8. During these trials, it took roughly 60 minutes to remove 30 mgNH₃/N/L at an injection rate of 8 g O₃/h, 40 minutes at 12 g O₃/h and 30 minutes at 16.5 g O₃/h. Based on these results, and since the OAR and OUE of these trials are all similar, we conclude that the amount of ozone added to the system is indeed what limits the reaction rates. In other words, it is expected that with an ozone generator with a high enough capacity, thus a large ozone injection rate, the duration of these batch trials could be reduced to a matter of minutes.

TABLE 8

OAR and OUE of Ozone Injection Rate Trials

| Date | Trial | OAR (mg O₃/mg NH₃—N) | OUE (%) |
|------|-------|------|------|
| 2020 Sep. 21 | 8.0 g O₃/h | 15.9 | 86.3 |
| 2020 Sep. 21 | 12.0 g O₃/h | 16.7 | 82.2 |
| 2020 Sep. 21 | 16.5 g O₃/h | 17.0 | 80.6 |

Hydraulic Retention Time

Pressure has a considerable impact on the ozone solubility in water, and consequently the mass transfer efficiency. As discussed above, most of the trials performed during this project were done with a pressure in the recirculation loop of 60 PSI. Also discussed above, this recirculation loop has an approximative volume of 0.5 liters. At a flowrate of 18 L/min, the hydraulic retention time in this loop is about 1.7 seconds. After this time, the solution enters 202 under atmospheric pressure.

Based on this information, we saw the opportunity to include a pressurized vessel within the recirculation loop to increase the hydraulic retention time and potentially improve the mass transfer efficiency. This was done by adding an empty heterogeneous reactor 228) in the recirculation loop. With an internal volume of 33 L, this reactor increased the HRT to approximately 111 seconds. Trials performed at 1.7 seconds and 111 seconds HRT are presented in FIG. 9 and Table 9.

Although the results of these trials are close to the uncertainty range of the system, it appears that the trials performed with longer HRT yield better results. In one case, an OAR of 14 was observed, which is very close to the stoichiometric requirement of 13.7. The duplicate of this trial yielded an OAR of 15.8, but also started at a lower ammoniacal nitrogen concentration. In the light of these results, we conclude that increasing hydraulic retention time has the potential to improve the mass transfer efficiency.

TABLE 9

OAR and OUE of Hydraulic Retention Time Trials

| Date | Trial | OAR (mg O₃/mg NH₃—N) | OUE (%) |
|------|-------|------|------|
| 2020 Sep. 21 | 1.7 seconds | 17.0 | 80.6 |
| 2020 Sep. 3 | 111 seconds | 14.0 | 97.6 |
| 2020 Sep. 22 | 111 seconds (duplicate) | 15.8 | 86.6 |

Initial and Final Ammonia Concentration

During the various trials detailed above, we observed that removal rate throughout these trials was somewhat consistent between 10 and 50 mg NH₃—N/L but started to taper off below this value. To highlight this phenomenon, an extended trial was performed in which a final concentration of 0.14 mg NH₃—N/L was obtained. Results from this trial is presented in FIG. 10. Also, in FIG. 11, the OAR results of several baseline trials are presented as a function of ammonia concentration. These trials confirm previous observation that lower final ammoniacal nitrogen concentration negatively impact the efficiency of the process. However, this impact appears to be limited to concentration of 12 mg NH₃—N/L and below. This observation highlights the interests to treat ammoniacal nitrogen concentration above 12 mg/l (−/+3) within one process step and ammoniacal nitrogen concentration below 12 (−/+3) mg/l within a second process step where recirculation parameters and injection parameters will be different.

Cyanates

Presence of thiocyanate, cyanide and cyanate may negatively impact the ammoniacal nitrogen removal by ozone. Of these species, cyanate may be particularly hard to treat at pH 9.5. Also, cyanate rapidly hydrolyzes to ammoniacal nitrogen under acidic conditions. To evaluate the impact of pH on the co-removal of cyanate and ammoniacal nitrogen, a SE sample was spiked with 50 mg CNO–N/L (SE+CNO). The trials were then run at pH 5, 7.5, and 9.5, under the same conditions listed for the baseline trials. In addition to the in-situ analysis on ammoniacal nitrogen, samples were taken every ten minutes and sent to laboratory for cyanate, nitrite, and nitrate analysis. See results in FIG. 12 and Table 10. Nitrite analysis were all below detection limit.

Figure 12:
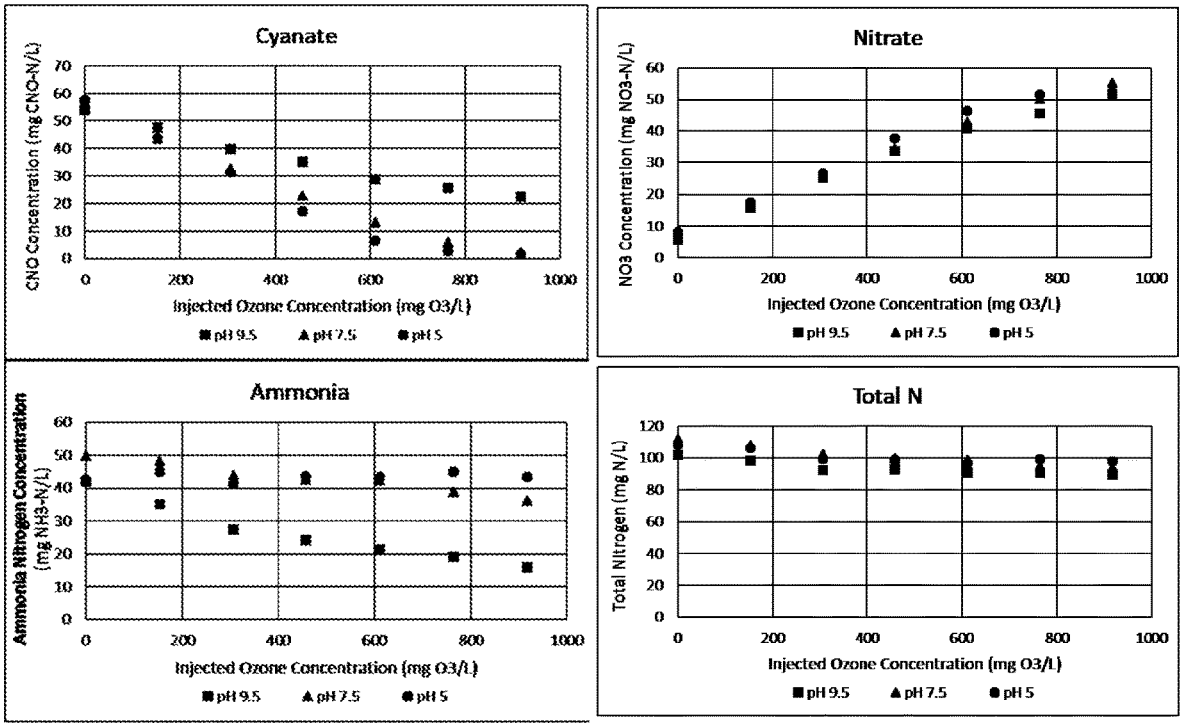
FIG. 12, in an X-Y graph, illustrates the impact of the pH on co-removal of cyanate and ammoniacal nitrogen for the pilot unit of FIG. 2.
Figure 13:
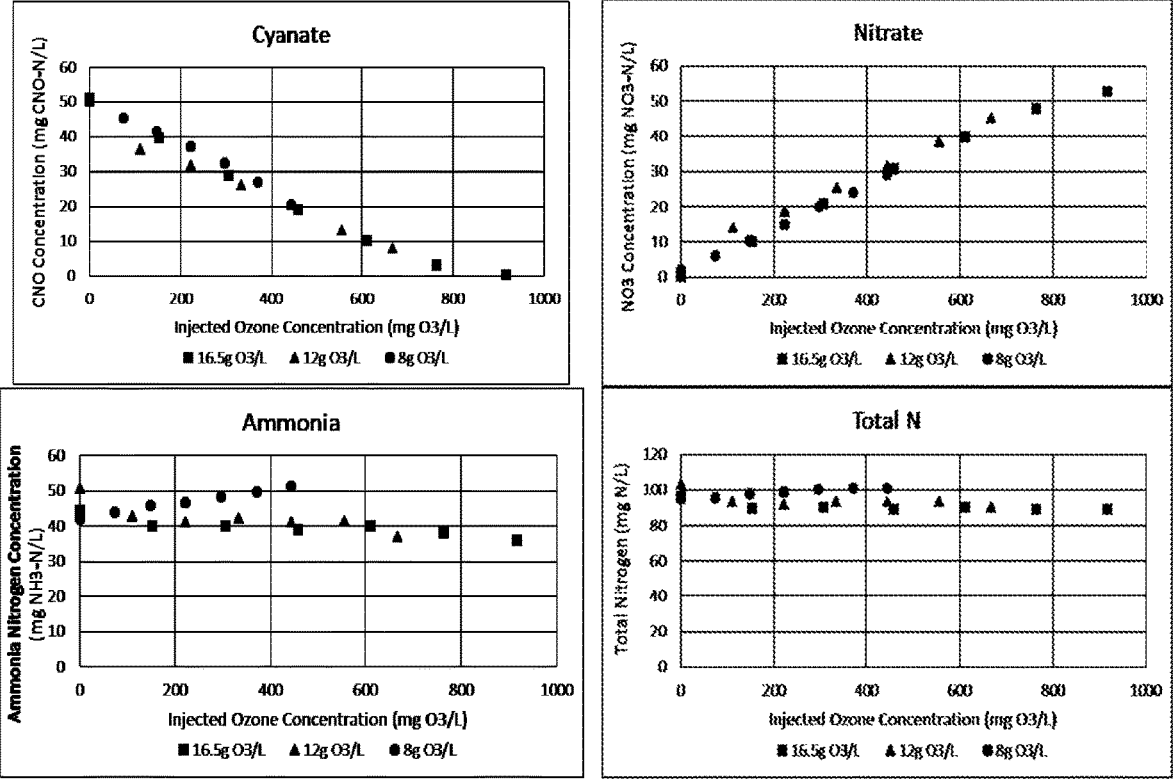
FIG. 13, in an X-Y graph, illustrates the impact of ozone injection rate on co-removal of cyanate and ammoniacal nitrogen for the pilot unit of FIG. 2.

In FIG. 12, the removal efficiency of cyanate for a given ozone dosage is much higher at pH 5 and 7.5 than at pH 9.5. This means that the optimal pH for ammoniacal nitrogen removal would be different than the optimal pH for cyanate removal. Thus, depending on the treatment goal, the pH set point of an ozonation process is typically adjusted to reflect this reality.

Also, the presence of nitrate in the treated water of the trials at pH 5 and 7.5 is particularly interesting. At these pH, efficient hydrolysis of cyanate to ammoniacal nitrogen, as well as poor oxidation of ammoniacal nitrogen to nitrate, was expected. An increase of ammoniacal nitrogen and little to no nitrate was anticipated in the treated effluent. However, the concentration of nitrate in the treated effluent tends to indicate that a different pathway from cyanate to nitrate (one that bypass ammoniacal nitrogen) may exist.

TABLE 10

OAR and OUE of pH Trials with Co-removal of Cyanate and ammoniacal nitrogen

| Date | Trial | OAR (mg O3/mg NH3—N) | OUE (%) |
|------|-------|------|------|
| 2020 Sep. 4 | pH 5.0-50 mg/L CNO—N | N/A | 102.8 |
| 2020 Sep. 4 | pH 7.5-50 mg/L CNO—N | 67.6 | 117.0 |
| 2020 Sep. 4 | pH 9.5-50 mg/L CNO—N | 35.1 | 98.7 |

Such pathways are poorly documented in the literature, but they might represent an approach to reduce the ozone requirement compared to normal stoichiometric demand. This is highlighted by the OUE results of trials performed at pH 5 and 7.5, which were both above 100%.

Also, additional trials were performed (pH 7.5, with 50 mg CNO—N/L) to determine whether the ozone injection rate or the reaction kinetic was the limiting factor of the reaction. Results from these trials are presented in FIG. 13 and Table 11. From these results, the impact of ozone injection rate on the co-removal of CNO and $NH_3$—N and $NO_3$ is hard to quantify, meaning that ozone injection rate remains the limiting factor. With CNO concentration trending similarly for all three trials, the difference in OAR and OUE between these trials is probably due to the imprecision of the ammonia selective probe. The trial at 12 g $O_3$/L started at a higher initial ammonia concentration, which could explain the higher OUE observed.

TABLE 11

OAR and OUE of Ozone Injection Rate Trials with
Co-Removal of Cyanate and ammoniacal nitrogen

| Date | Trial | OAR (mg O3/mg NH3—N) | OUE (%) |
|---|---|---|---|
| 2020 Sep. 17 | 8.0 g O3/L + 50 mg/L CNO—N | 48.2 | 88.4 |
| 2020 Sep. 17 | 12.0 g O3/L + 50 mg/L CNO—N | 48.3 | 136.9 |
| 2020 Sep. 17 | 16.5 g O3/L + 50 mg/L CNO—N | 106.1 | 108.0 |

Trials on Real Effluents
Ozone Alone—Single pH

Figure 14:
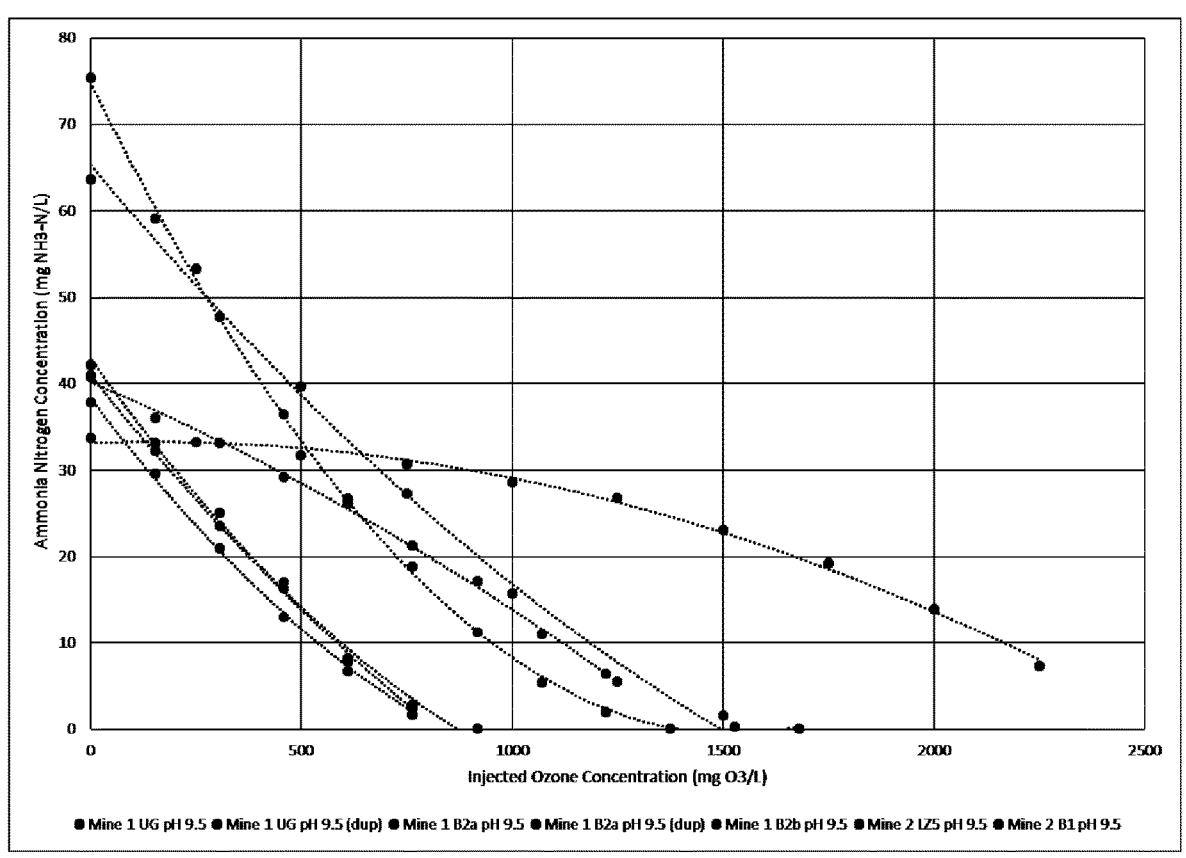
FIG. 14, in an X-Y graph, illustrates the results of ozonation trials on real effluents at pH 9.5 for the pilot unit of FIG. 2.
Figure 15:
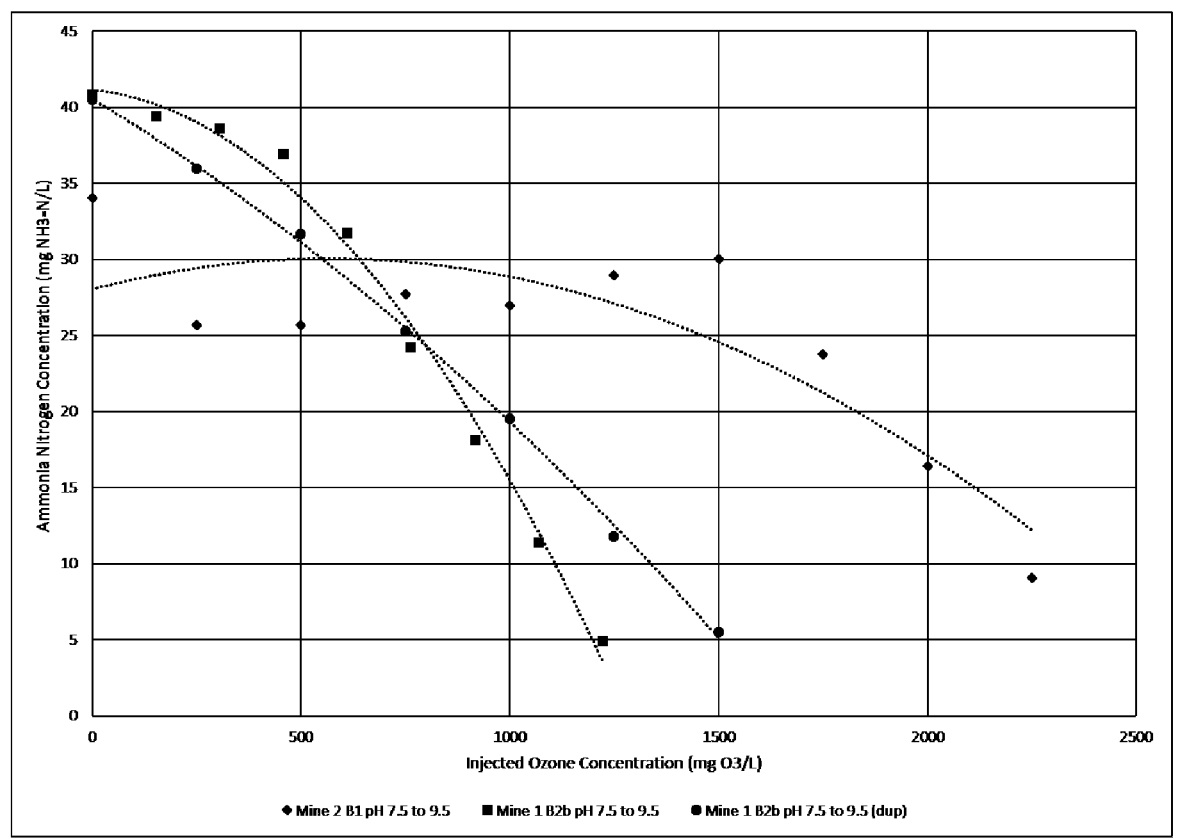
FIG. 15, in an X-Y graph, illustrates the results of ozonation of real effluents at pH 7.5 followed by ozonation at pH 9.5 for the pilot unit of FIG. 2.
Figure 16:
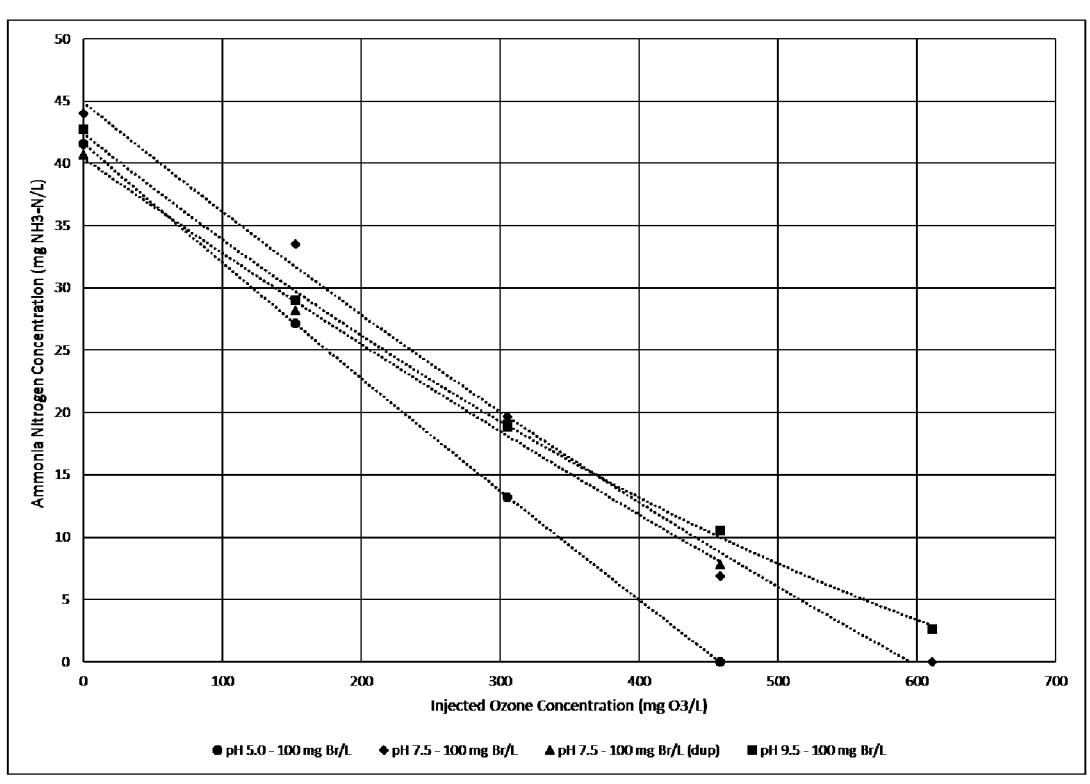
FIG. 16, in an X-Y graph, illustrates the impact of pH on ozone requirements in presence of bromide for the pilot unit of FIG. 2.
Figure 17:
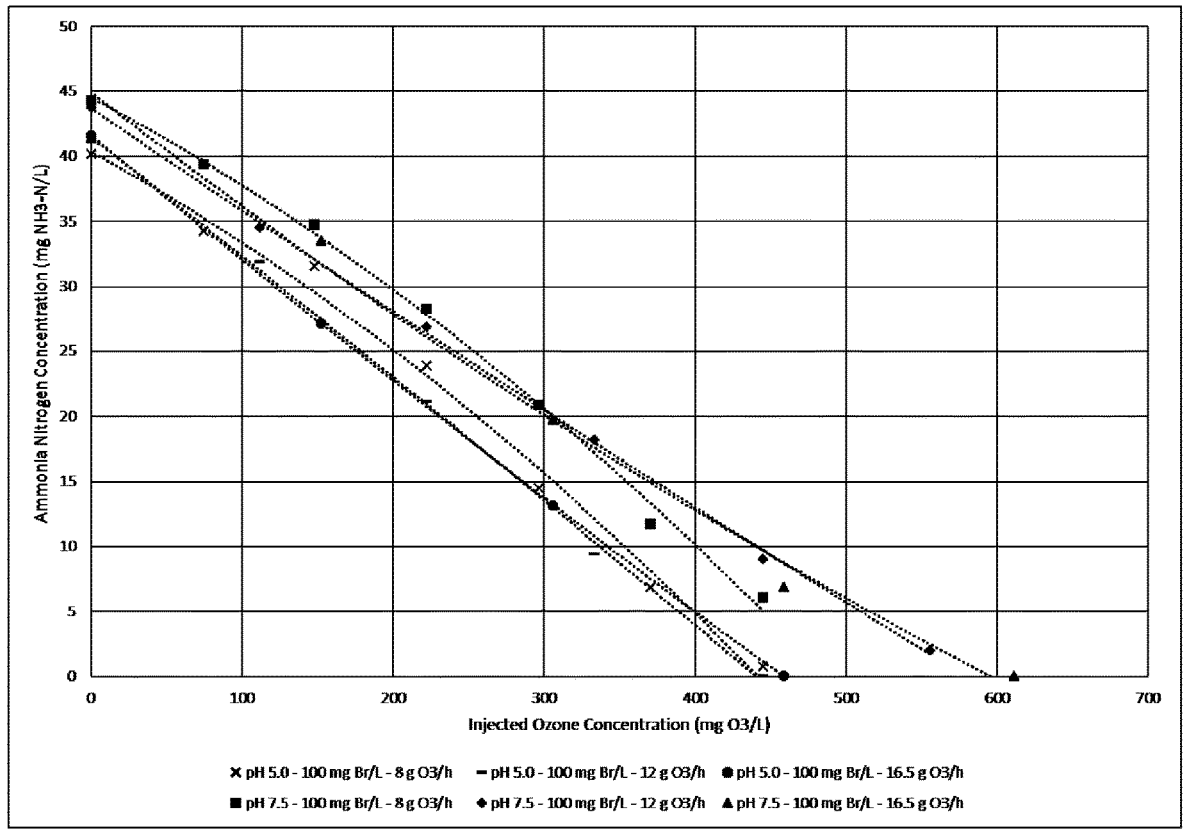
FIG. 17, in an X-Y graph, illustrates the impact of pH and ozone injection rate on ozone requirements in presence of bromide for the pilot unit of FIG. 2.
Figure 18:
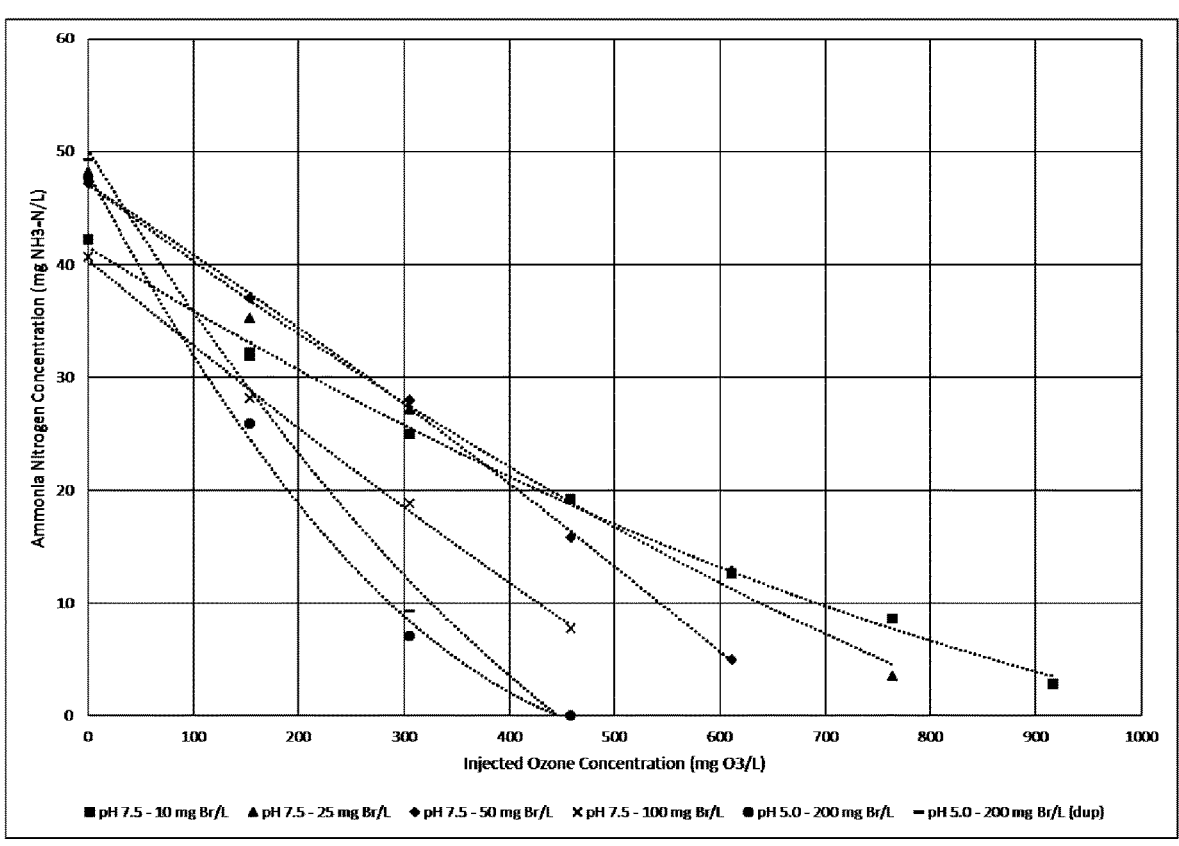
FIG. 18, in an X-Y graph, illustrates the impact of pH and bromide concentration on ozone requirements for the pilot unit of FIG. 2.

Results of ozonation trials at pH 9.5 on real effluents are presented in FIG. 14 and Table 12. Based on FIG. 14, ozone requirement to treat real effluents can vary widely depending on the level of contaminant in these effluents. Slightly contaminated effluents such as the UG samples (about 50 mg $NH_3$—N/L) took approximately 750 mg $O_3$/L to reduce ammoniacal nitrogen below 5 mg N/L, while strongly contaminated effluents such as B1 (about 100 mg SCN—N/L) required more than 2000 mg $O_3$/L to achieve similar results.

Also, since some of these effluents contained thiocyanate and cyanate, comparing the OAR results can be misleading. In this case, comparing OUE would be more appropriate, because this ratio also considers cyanide and cyanide related species. However, some of the OUE presented in Table 12 could not be calculated because of missing concentration of cyanate and thiocyanate in the treated effluents. In this case, the mention "N/A" was used.

As observed above, OUE well above 100% were observed for B1. This might be explained by the presence of a reaction pathway different than the ones assumed above and widely reported in the literature. A OUE above 100% was also observed for LZ5. Given a total nitrogen removal of 29% and 32% respectively, it is hypothesized that some catalytic ozonation is occurring when treating these samples. Higher removal rate could have been reached with additional injection of ozone. Nevertheless, with OUE ranging between 91 and 127%, we conclude that ozonation at pH 9.5 showed good efficiency for all real effluents tested.

Finally, removal rates achieved at pH 9.5 on the main contaminants of concern for each of these waters are presented in Table 13. Observed removal rates of thiocyanate and cyanide are in the high nineties. Removal rate for ammoniacal nitrogen and cyanate varied between 59 to 99% and 47 to 99% respectively.

TABLE 12

OAR and OUE results of ozonation trials on real effluents-pH 9.5

| Date | Trial | OAR (mg O3/mg NH3—N) | OUE (%) |
|---|---|---|---|
| 2020 Sep. 8 | Mine 1 UG pH 9.5 | 19.6 | 90.5 |
| 2020 Oct. 5 | Mine 1 UG pH 9.5 (dup) | 18.0 | N/A |
| 2020 Sep. 8 | Mine 1 B2a pH 9.5 | 21.5 | 93.6 |
| 2020 Oct. 1 | Mine 1 B2a pH 9.5 (dup) | 15.3 | N/A |
| 2020 Oct. 6 | Mine 1 B2b pH 9.5 | 35.4 | N/A |
| 2020 Oct. 15 | Mine 2 LZ5 pH 9.5 | 20.1 | 106.2 |
| 2020 Oct. 16 | Mine 2 B1 pH 9.5 | 85.0 | 127.4 |

TABLE 13

Achieved Removal Rate for Key Contaminant of Concerns After Ozonation at pH 9.5.

| Parameters | Real Effluents | | | | | |
|---|---|---|---|---|---|---|
| | UG | B2a | B2b | B1 | LZ5 | Mine 3 |
| SCN—N initial conc. (mg/L) | <0.05 | 1.81 | 2.33 | 107.44 | 0.084 | 4.76 |
| SCN—N final conc. (mg/L) | <0.05 | <0.05 | <0.05 | <0.05 | <0.05 | <0.05 |
| SCN—N removal rate (%) | N/A | 100% | 100% | 100% | 100% | 100% |
| WAD CN—N initial conc. (mg/L) | <0.001 | <0.001 | <0.001 | 3.85 | <0.001 | N/A |
| WAD CN—N final conc. (mg/L) | <0.001 | 0.011 | <0.001 | 0.01 | <0.001 | N/A |
| WAD CN—N removal rate (%) | N/A | N/A | N/A | 99.60% | N/A | N/A |
| CNO—N initial conc. (mg/L) | <0.01 | 11.87 | 63.3 | 10.83 | 0.04 | <0.001 |
| CNO—N final conc. (mg/L) | 0.14 | 3.10 | 0.47 | 5.7 | 0.29 | 6.5 |
| CNO—N removal rate (%) | N/A | 74% | 99% | 47% | N/A | N/A |
| NH3—N initial conc. (mg/L)[1] | 53.4[2] | 89.65[2] | 33.92 | 17.82 | 64.42 | 440 |

TABLE 13-continued

Achieved Removal Rate for Key Contaminant of Concerns After Ozonation at pH 9.5.

| | Real Effluents | | | | | |
|---|---|---|---|---|---|---|
| Parameters | UG | B2a | B2b | B1 | LZ5 | Mine 3 |
| NH3—N final conc. (mg/L)[1] | 2.97 | 1.40 | 9.03 | 7.3 | 5.3 | 12 |
| NH3—N removal rate (%) | 94% | 99% | 73% | 59% | 92% | 0.97 |
| NO2—N initial conc. (mg/L) | 2.01 | 2.00 | 3.28 | 0.58 | 0.57 | 26 |
| NO2—N final conc. (mg/L) | <0.01 | <0.01 | <0.01 | <0.01 | <0.01 | 0.77 |
| NO2—N removal rate (%) | 100% | 100% | 100% | 100% | 100% | 0.97 |
| NO3—N initial conc. (mg/L) | 15.3 | 14.9 | 11.4 | 13.4 | 17.6 | 381 |
| NO3—N final conc. (mg/L) | 72 | 89 | 73 | 85.5 | 51.7 | 494 |
| NO3—N removal rate (%) | −371% | −497% | −540% | −538% | −194% | −30% |
| Total N initial conc. (mg/L) | 63.4 | 109.9 | 124.7 | 144 | 85.6 | 847 |
| Total N final conc. (mg/L) | 76.1 | 99 | 98 | 102.7 | 58 | 554 |
| Total N removal rate (%) | −20% | 10% | 21% | 29% | 32% | 35% |

[1]Concentration of CNO—N were subtracted from these values due to interference
[2]Spiked with 50 mg NH3—N/L
3Spiked with 50 mg CNO—N/L
4From Mine 2 database. Erroneous results from H2lab (<0.05 mg SCN—N/L)

Ozone Alone—2 Steps pH

As noted above, the potential oxidation of cyanate directly to nitrate may help to reduce ozone requirements, chemical consumption, or both. A two-step approach was tested on real effluent containing cyanate (i.e. B2 and B1). With this approach, an ozonation step at pH 7.5 was first applied to remove cyanate. Then, the pH was adjusted to 9.5 for ammoniacal nitrogen removal. The results from these trials are presented in FIG. 15 and Table 14. While comparing the OAR and OUE results from the single pH and dual pH approach, suggests that ozone requirements are similar for both protocols, as the OARs on B2b are similar ammonia. The targeted concentration in the discharged effluent is not the same for cyanate and ammonia. Therefore, it is important to be able to target each contaminant separately to ensure optimized used of the ozone and that discharge limit is met for each contaminant. Consequently, a two-step approach becomes an advantage for resilient and robust process for mine tailing facilities water. Furthermore, using the process step 145 of FIG. 1 during cold months to treat cyanate without forming ammoniacal nitrogen is also an economical and risk mitigation advantage.

TABLE 14

OAR and OUE Results of Ozonation Trial on Real Effluents-pH 7.5 and 9.5

| Date | Trial | pH Adjustment Timing | OAR (mg O3/mg NH3—N) | OUE (%) |
|---|---|---|---|---|
| 2020 Oct. 19 | Mine 2 B1 pH 7.5 to 9.5 | t60 | 70.7 | N/A |
| 2020 Oct. 6 | Mine 1 B2b pH 7.5 to 9.5 | t30 | 34.0 | N/A |
| 2020 Oct. 30 | Mine 1 B2b pH 7.5 to 9.5 (dup) | t35 | 42.9 | 94.0 | in both cases, while the OUE of B1 appears slightly better with the dual pH approach. However, a two-step approach can allow for a robust treatment approach that can be easily adapted to the cyanate concentration variation in mine tailing facilities that varies all year long. Per example, cyanate concentration in Mine 1 tailing water varies from 300 mg/l from winter and spring down to 40 mg/l during summer and early fall before increasing again. The ammonia concentration is inversely affected. Cyanate concentration strongly varies in function of the sunlight exposition, and therefore its concentration every months of the year varies significantly in the mine tailing facilities. When the cyanate is hydrolyzed by the action of the sunlight it generates Bromide Numerous trials were performed on ozonation of ammoniacal nitrogen in presence of bromide. Using a potassium bromide (KBr) solution, SE samples were spiked with KBr to determine the impact of pH, ozone injection rate and bromide concentration on ozone requirements. Results from these trials are respectively presented in FIGS. 16 to 19 and Tables 15 to 18. From these trials, the following conclusion were drawn:

The presence of bromide ions enhances the oxidation of ammoniacal nitrogen at pH below 9.5. At 25 mg Br/L and pH 7.5, a similar OAR as ozone alone at pH 9.5 is obtained.

The OAR and OUE results improved with an increase of bromide (tested up to 200 mg/L) and a decrease of pH (tested up to pH 5.0).

Variation of the ozone injection rate does not appear to make much difference on the OAR and OUE. Thus, ozone injection rate remains the limiting factor even in presence of bromide.

The negative impact on reaction rate of low ammonia concentration in the treated water appears to be minimized by addition of bromide, especially above 50 mg Br/L. The tapering off below 15 mg $NH_3$—N/L observed in absence of bromide are not as important in presence of the catalyst. Final concentration below 0.2 mg $NH_3$—N/L were obtained with less than 600 mg $O_3$/L with 100 mg Br/L, compared to over 1 200 mg $O_3$/L without bromide.

Figure 19:
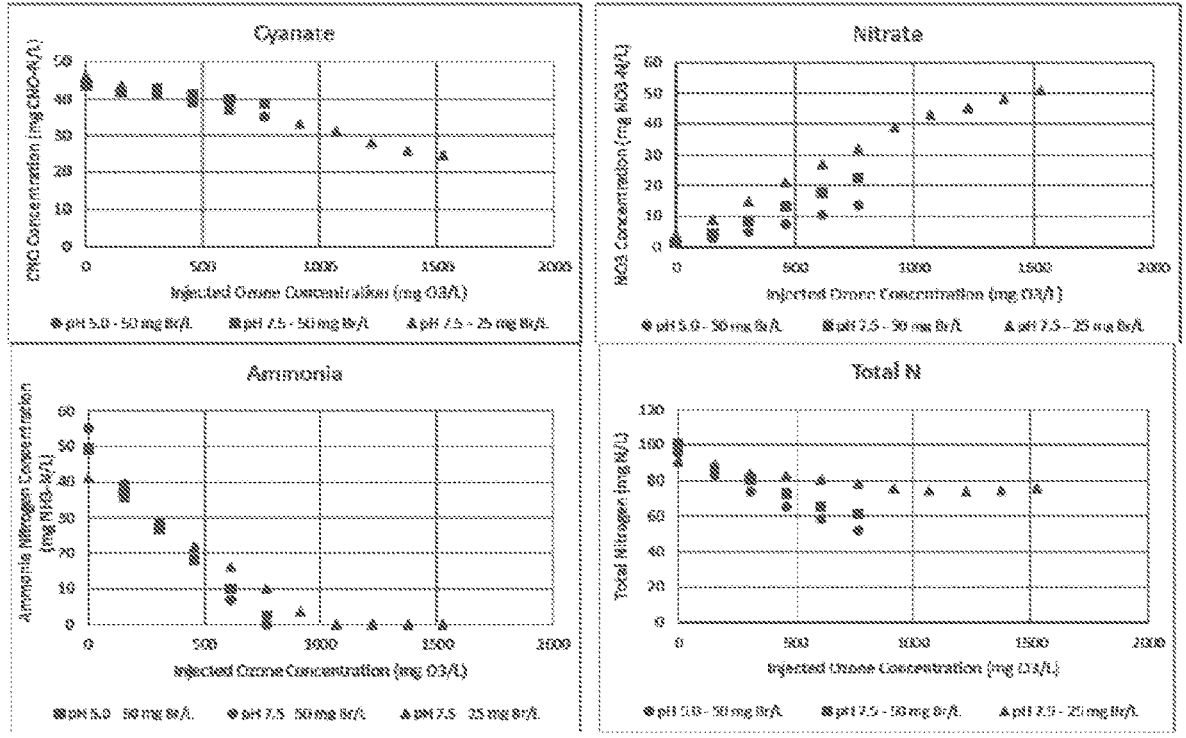
FIG. 19, in an X-Y graph, illustrates the impact of bromide on the co-removal of cyanate and ammoniacal nitrogen for the pilot unit of FIG. 2.
Figure 20:
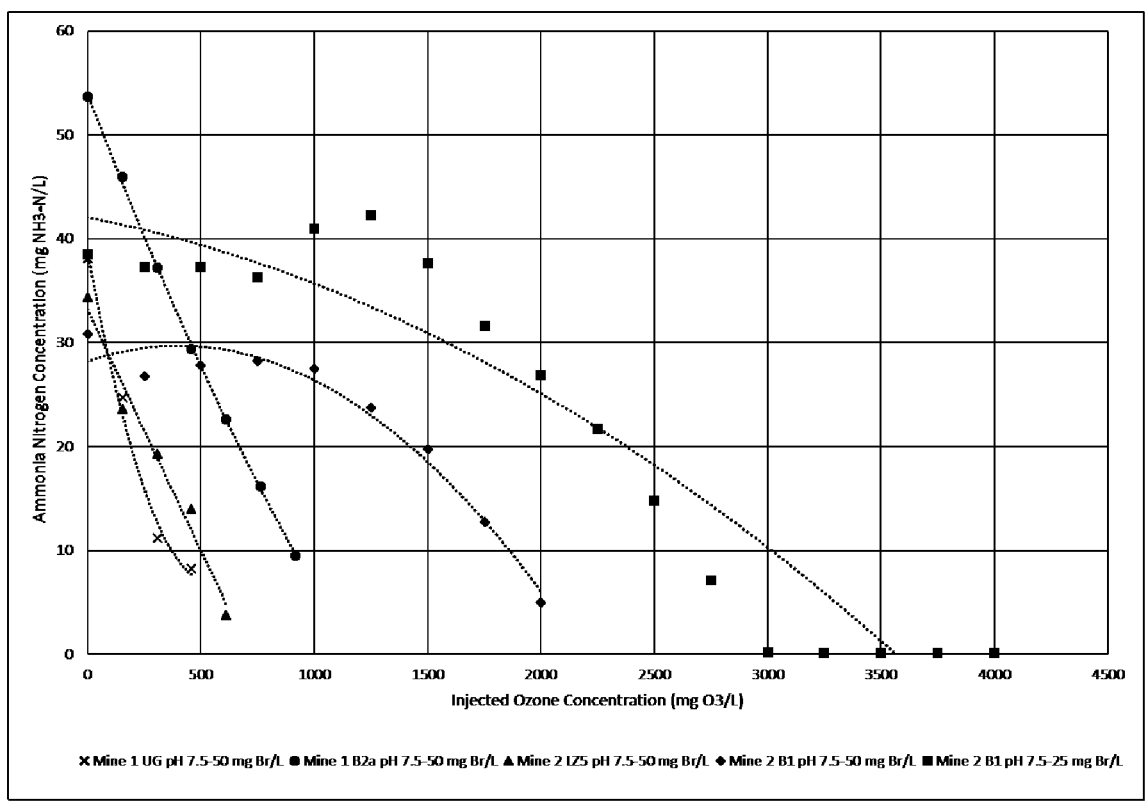
FIG. 20, in an X-Y graph, illustrates the results of ozonation trials on real effluents with bromide addition for the pilot unit of FIG. 2.
Figure 21:
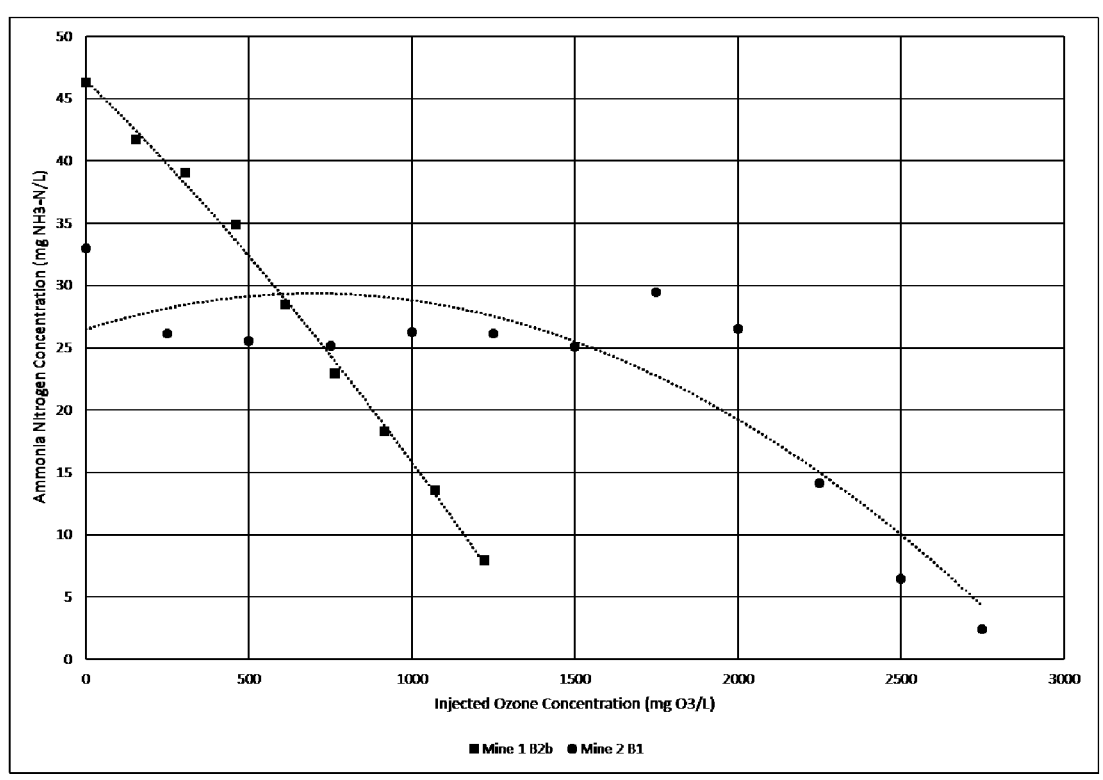
FIG. 21, in an X-Y graph, illustrates the results of ozonation trials on real effluents with the addition of lime softening as an intermediate step for the pilot unit of FIG. 2.

The impact of bromide on the co-removal of cyanate and ammoniacal nitrogen was also investigated, and the results of these trials are presented in FIG. 19 and Table 18. These results indicated that the presence of bromide favors the oxidation of ammoniacal nitrogen over the oxidation of cyanate at pH 5.0 and 7.5. Also, a reduction of the total nitrogen can be observed in presence of bromide, which could indicate formation of nitrogen gas ($N_2$), as well as the presence of residual bromamine in the treated effluents.

TABLE 15

OAR and OUE of pH Trials in Presence of Bromide

| Date | Trial | OAR (mg $O_3$/mg $NH_3$—N) | OUE (%) |
|---|---|---|---|
| N/A | pH 9.5-Ozone alone (average) | 17.3 ± 2 | 81 ± 11 |
| 2020 Sep. 22 | pH 5.0-100 mg Br/L | 10.8 | 127.3 |
| 2020 Sep. 22 | pH 7.5-100 mg Br/L | 12.4 | 110.9 |
| 2020 Sep. 24 | pH 7.5-100 mg Br/L | 13.9 | 98.2 |
| 2020 Sep. 22 | pH 9.5-100 mg Br/L | 15.2 | 89.9 |

TABLE 16

OAR and OUE of pH and Ozone Injection Rate in Presence of Bromide

| Date | Trial | OAR (mg O3/mg NH3—N) | OUE (%) |
|---|---|---|---|
| N/A | pH 9.5-Ozone alone (average) | 17.3 ± 2 | 81 ± 11 |
| 2020 Sep. 23 | pH 5.0-100 mg Br/L-8 g O3/h | 11.1 | 123.1 |
| 2020 Sep. 23 | pH 5.0-100 mg Br/L-12 g O3/h | 10.5 | 130.2 |
| 2020 Sep. 22 | pH 5.0-100 mg Br/L-16.5 g O3/h | 10.8 | 127.3 |
| 2020 Sep. 23 | pH 7.5-100 mg Br/L-8 g O3/h | 11.6 | 117.8 |
| 2020 Sep. 23 | pH 7.5-100 mg Br/L-12 g O3/h | 12.8 | 106.9 |
| 2020 Sep. 22 | pH 7.5-100 mg Br/L-16.5 g O3/h | 12.4 | 110.9 |

TABLE 17

OAR and QUE of pH and Bromide Concentration Trials

| Date | Trial | OAR (mg O3/mg NH3—N) | OUE (%) |
|---|---|---|---|
| N/A | pH 9.5-Ozone alone (average) | 17.3 ± 2 | 81 ± 11 |
| 2020 Sep. 24 | pH 7.5-10 mg Br/L | 23.3 | 58.9 |
| 2020 Sep. 24 | pH 7.5-25 mg Br/L | 17.1 | 80.1 |
| 2020 Sep. 24 | pH 7.5-50 mg Br/L | 14.5 | 94.6 |
| 2020 Sep. 24 | pH 7.5-100 mg Br/L | 13.9 | 98.2 |

TABLE 17-continued

OAR and QUE of pH and Bromide Concentration Trials

| Date | Trial | OAR (mg O3/mg NH3—N) | OUE (%) |
|---|---|---|---|
| 2020 Sep. 25 | pH 5.0-200 mg Br/L | 7.5 | 182.4 |
| 2020 Sep. 28 | pH 5.0-200 mg Br/L (dup) | 7.6 | 179.1 |

TABLE 18

OAR and OUE of Bromide Trials with Co-Removal of Cyanate and ammoniacal nitrogen

| Date | Trial | OAR (mg O3/mg NH3—N) | OUE (%) |
|---|---|---|---|
| N/A | pH 9.5-Ozone alone (average) | 17.3 ± 2 | 81 ± 11 |
| 2020 Sep. 28 | pH 5.0-50 mg Br/L | 16.4 | 104.3 |
| 2020 Sep. 28 | pH 7.5-50 mg Br/L | 15.8 | 110.4 |
| 2020 Oct. 22 | pH 7.5-25 mg Br/L | 24.4 | 84.8 |

Ozone with Bromide

Then, real effluents were ozonated in presence of 50 mg/L of bromide at pH 7.5. The results from these trials are presented in FIG. 20 and Table 19. Each of these trials showed better CUE than its counterpart at pH 9.5. This once again highlights the potential of using bromide to reduce ozone requirements, while allowing ionized ammonia (ammonium/$NH_4$+) oxidation at pH closer to neutrality.

TABLE 19

OAR and OUE Results of Ozonation Trial on Real Effluent-Bromide Addition

| Date | Trial | OAR (mg $O_3$/mg $NH_3$—N) | OUE (%) |
|---|---|---|---|
| 2020 Oct. 5 | EGO UG pH 7.5-50 mg Br/L | 17.2 | 134.1 |
| 2020 Oct. 2 | EGO B2a pH 7.5-50 mg Br/L | 20.7 | 142.1 |
| 2020 Oct. 15 | AEM LZ5 pH 7.5-50 mg Br/L | 20.0 | 126.2 |
| 2020 Oct. 16 | AEM B1 pH 7.5-50 mg Br/L | 77.4 | 134.0 |

Lime Softening as an Intermediate Step

Given the negative impact of alkalinity on the ozonation of ammoniacal nitrogen at pH 9.5, and the fact that bicarbonate is produced during the ozonation of cyanate, it was deemed interesting to attempt adding a lime softening step between the two ozonation steps (the first one at pH 7.5, and the second on at pH 9.5). During the first ozonation step, cyanate would be oxidized, and bicarbonate would be produced. Then, the lime softening step would not only allow the removal of some of that alkalinity, but also the removal of heavy metals. It would also increase the pH, which would be beneficial for the last ozonation step to remove ammoniacal nitrogen at pH 9.5. This treatment philosophy was reproduced in the pilot unit 200 in FIG. 21 and Table 20. Results were similar to the OAR and OUE of trials performed at pH 9.5 only.

Intermediate Step

TABLE 20

OAR and OUE Results of Ozonation Trial on Real Effluent-
Lime Softening as an Intermediate Step

| Date | Trial | OAR (mg O3/mg NH3—N) | OUE (%) |
|---|---|---|---|
| 2020 Oct. 7 | EGO B2b | 31.9 | 114.2 |
| | Step 1: Ozone pH 7.5 (458 mg $O_3$/L) | | |
| | Step 2: Lime softening pH 10.5 | | |
| | Step 3: Ozone pH 9.5 | | |
| 2020 Oct. 20 | AEM B1 | 90.1 | 109.4 |
| | Step 1: Ozone pH 7.5 (917 mg $O_3$/L) | | |
| | Step 2: Lime softening pH 10.5 | | |
| | Step 3: Ozone pH 9.5 | | |

Based on the results stated above, many different processed can be proposed regarding the treatment of mining effluent containing cyanide species and ammoniacal nitrogen. These approaches, and their variations, are described as:

Ozonation at Two pHs

The first approach consists of removal of the cyanide species (HCN, CNO, SCN) at quasi-neutral pH (gold mine TSF are usually at pH between 7.5 and 8.5) and then increase pH at 9.5 to remove NH$_3$—N. More specifically, this process starts by pumping water contained in a mine tailing pond to an ozonation unit operated at lower pH, for example a pH around 7.5 (or TSF pH). At this pH, cyanide species undergo oxidation, with the final product being nitrate while avoiding generating ammoniacal nitrogen. The addition of a small amount of NaOH may be required in some embodiments while this reaction occurs to maintain the pH of the reaction within a suitable interval. The water is then ozonated at pH around 9.5, where ammoniacal nitrogen is oxidized to nitrate. In this step, the addition of an alkaline product, such as sodium hydroxide (NaOH) or lime, is required to rise the pH and maintain the pH during the reaction. The water then flows towards a conventional total suspended solid (TSS) and a metal removal step, followed by a pH adjustment step before discharge to a polishing pond. A lime treatment or a sulfide precipitation approach could be used.

It is expected that the temperature impact on ozone efficiency will be limited, which would allow for year-round operations. The water can be discharged all year long to reduce amount of water in the TSF at spring if this is technically possible at the mine site. This allows to reduce the water risk for the mine site by reducing the overall water volume stored onsite and to reduce the maximum flow rate and contaminant concentration used for the basis of design, leading to possible OPEX and CAPEX savings.

In some embodiments, the treated water can be recirculated within the tailing pond to gradually lower the concentration of cyanide species and ammoniacal nitrogen within the tailing pond as a kidney function, as further described below.

Figure 22:
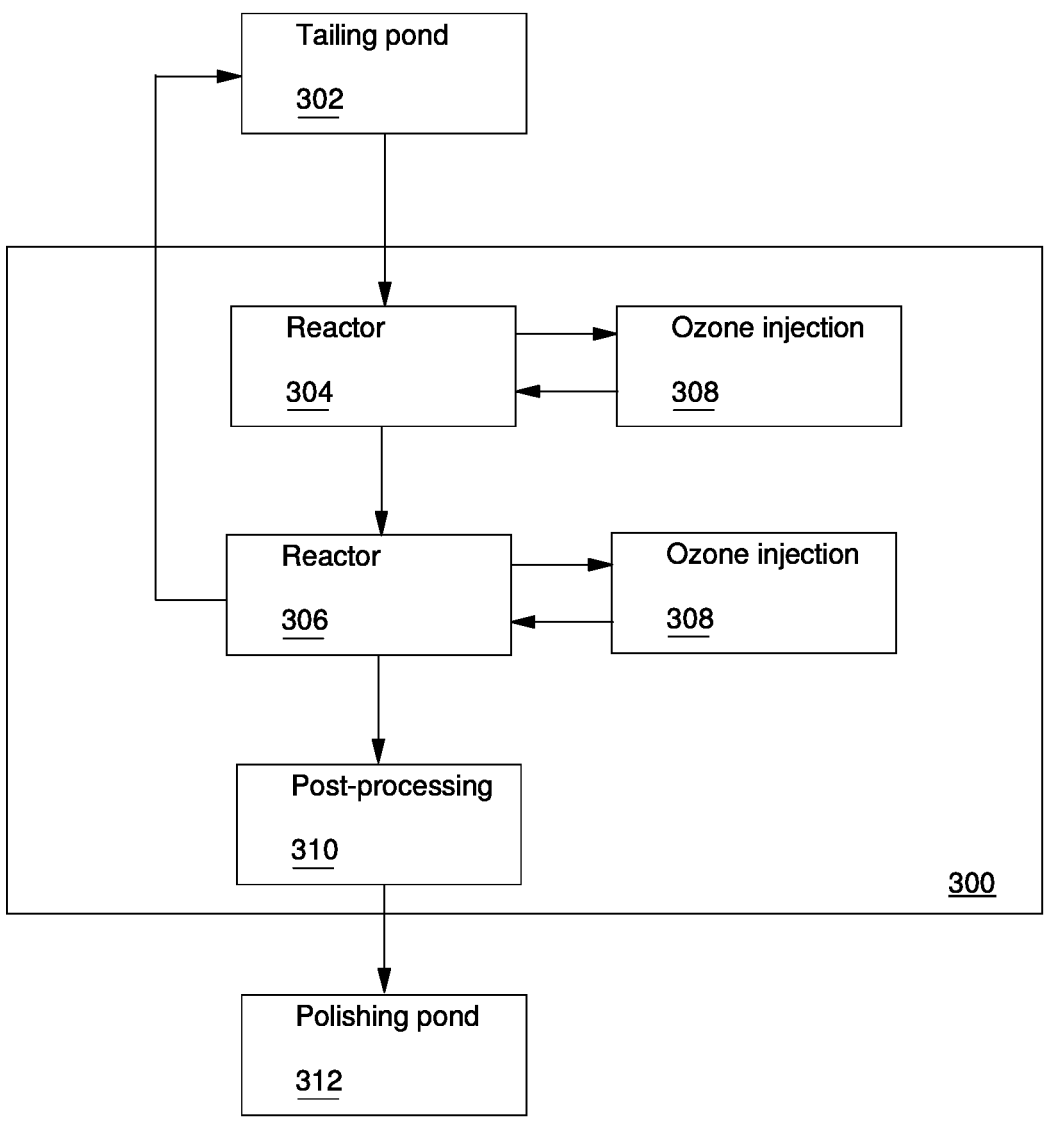
FIG. 22, in a schematic view, illustrates a plant usable to preform the method of FIG. 1.

This process may be performed using the plant 300 schematically illustrated in FIG. 22. The plant 300 accepts water from tailing pond 302. The plant 300 includes a first reactor 304 and a second reactor 306. The first and second reactors 304 and 306 are typically in the form of vessels or basins open to the atmosphere. The first and second reactors 304 and 306 circulate continuously the water contained therein through a respective ozone injector 308 operative to inject ozone in the water. The ozone injector 308 may be similar to the ozone injection components of the pilot unit 200, or may take any other suitable form.

Water can be transferred from the first reactor 304 to the second reactor 306. This transfer can be performed in a strict batch manner, in which substantially all the water contained in the first reactor 304 is transferred to the second reactor 306 once predetermined criteria are reached, such as a maximal concentration of cyanide species in the treated water, among other possibilities. In an alternative embodiment, the water contained in the first reactor 304 is continuously tapped and fed to the second reactor 306 and the first reactor is fed continuously from the tailing pond 302 at a rate small enough that water quality in the first reactor remains within the predetermined criteria required to ensure proper operation of the process.

Water from the second reactor 306 is then transferred to a post-processing unit 310 in which metal and suspended solid removal is performed, along with pH adjustment and transfer to a polishing pond 312. As above, this transfer can be performed in a batch process, or by continuously tapping the second reactor 306.

Conventional treatments with ozone at a single pH typically result in cyanate oxidizing into ammoniacal nitrogen. This added load of ammoniacal nitrogen then requires more ozone to be further oxidized to nitrate. In contrast, using the suggested approach (for example pH 7.0-8.5 in the first reactor 304 and pH 9.0-10.5 in the second reactor, it was found that at pH around 7.5 cyanate directly oxidizes to nitrate, potentially reducing the overall ozone consumption required to treat such water while increasing treatment philosophy flexibility. In the case where only cyanate is the contaminant of interest, using this approach, it would not be required to treat ammoniacal nitrogen in a second reactor at high pH since no ammonia would have be generated. ammoniacal nitrogen is not oxidize at acidic and neutral pH.

Ozonation at High pH

In situations where the only contaminant in the TSF or in the underground dewatering water is ammoniacal nitrogen, a unique ozonation at a pH of about 9.5 would be required. Also, the necessity of a settling step for TSS and metal removals will be function of the influent water quality and discharge limits to meet.

Ozonation and Bromide

Depending on site specific requirements, in another embodiment, the use of bromide as a catalyst to target NH$_4^+$ at quasi-neutral pH or acidic pH to avoid any pH adjustment may be envisioned. Due to the ability to target NH$_4^+$ among other contaminants by using bromide, this approach could be considered for an existing treatment plant that requires modification to treat ammonia while minimizing the retrofit and brownfield works, i.e. CAPEX. For example, in such embodiments, the water contained in the tailing pond 302 has a pH of 7.0-8.0 and no significant pH adjustment is performed with treatment in the first reactor 304. At this pH, cyanide species undergo oxidation, with the final product being nitrate. In the first reactor 304, alkaline product (such as sodium hydroxide or lime) may added to maintain substantially constant pH during the reaction, which may enable hydrolysis/oxidation of cyanide, cyanate and thiocyanate.

In a the second reactor 306, sodium bromide or potassium bromide, among other possibilities, is added as a catalyst and alkaline products (such as sodium hydroxide or lime) may be added if required to maintain constant pH during the reaction, which enable the oxidation of ammoniacal nitrogen (ammonium speciation) at quasi-neutral pH or acidic pH. If a batch process is used, a single reactor 304 may be used with addition of catalyst and alkaline product when predetermined criteria are met. The use of two reactors 304 and 306 allows for continuous treatment by tapping the first and second reactors 304 and 306 as described above. Post treatment downstream of reactors 306 then proceeds as described above. In some embodiments, a filtration on GAC is added to adsorb possible toxicity related to by-product generated with bromide.

The process is again relatively unaffected by water temperature and can operate all year long and water can be discharged all year long to reduce amount of water in the TSF at spring if this is technically possible at the mine site. This allows to reduce the water risk for the mine site by reducing the overall water volume stored onsite and to reduce the maximum flow rate and contaminant concentration used for the basis of design, leading to possible OPEX and CAPEX savings.

Alternatively, as above, the water can be recirculated after ozonation within the tailing pond to gradually lower the concentration of contaminants as a kidney function, as described in the section below.

Since ozone production equipment can be expensive, the use of bromide can then help reduce the CAPEX of an ozonation plant by reducing the required ozone dose and the ozone equipment size.

Kidney Function Application

In situations where a mine site cannot benefit from the advantage to discharge year-around, a kidney function approach may be used. The objective, as shown in previous figures is to recirculate the treated effluent back to the TSF to lower the concentration of the contaminants within the TSF, wherein the plant 300 acts as a kidney, which continuously filter the water contained in the TSF to remove contaminants, similarly to the way kidneys continuously filter blood. The treatment can either target only the cyanide, cyanate, and thiocyanate at pH 7.5 without generating ammoniacal nitrogen or all nitrogen-based contaminants at pH 9.5.

As discussed previously, the highest concentrations of cyanate through the year are occurring in spring, due to reduction of natural degradation over the winter. This situation occurs at the same time as the freshet, when large volumes of water need to be discharged to the environment. In such conditions, the water is at the coldest temperature of the year, the concentration in cyanide related species is the highest of the year, and the volume of water to be discharge is the largest of the year. This represents a risky situation for mining operations, especially if the water levels in the TSF are too high and the water quality does not meet permit discharge limits. Therefore, the idea of treating year-round either for water discharge or as a kidney function to reduce contaminant concentration aims to reduce the CAPEX.

Therefore, treating cyanide related species at pH 7.5 in a kidney arrangement during the winter months (around half the year) will reduce overall requirements of acid and alkaline products and avoid the formation of ammonia during that period. In some embodiment, the alkalinity and contaminants mass balance are adjusted during the winter months to avoid generating a scavenger effect within the TSF that would be detrimental to the ammonia treatment.

Of note, in some embodiments, more than 0.2 g/L of Ozone is injected, and in some embodiments 1 g/L or above. This is a very large quantity of ozone that is typically not used in water treatments.

Summary of Results on Synthetic Effluents

Table 21 summarizes the finding described in the example section. These Tables also highlight approaches that are usable in some embodiments, but other parameters may be used when required.

TABLE 21

| Summary of the Conclusion Drawn During the Parametric Trials | | | |
|---|---|---|---|
| Parameter tested | Range Tested | Results | Conclusion |
| pH | 5.0, 7.5 and 9.5 | High pH improves ozone efficiency for $NH_3$—N removal. | Use pH 8.5 or 9.0 to 10.0 or 10.5 to remove $NH_3$—N |
| Alkalinity | 70, 170 and 270 mg $CaCO_3$/L | Little to no impact from 70 to 270 mg$CaCO_3$/L. | Maintain alkalinity at about 300 mg$CaCO_3$/L or less. |
| Temperature | 8 to 11, 12 to 14, 20, 30 and 40° C. | Little to no impact between 12 and 40° C. Perhaps a small reduction in the ozone efficiency around 10° C. due to ammonia speciation. | Increase pH slightly at lower temperature. For example .5 increase at 12° C. or less. |
| Ozone injection rate | 8, 12, 16.5 and 27 g $O_3$/h | Little to no impact on ozone efficiency. | |
| Hydraulic retention time | 1.7 and 111 seconds | High retention time appears to have a slight positive impact on ozone efficiency. | Use atmospheric pressure, pressurize reactors, or insert pressurized tank between ozone injection and reactors. |

TABLE 21-continued

Summary of the Conclusion Drawn During the Parametric Trials

| Parameter tested | Range Tested | Results | Conclusion |
|---|---|---|---|
| Bromide | 10 to 200 mg Br/L | Br positively impacts ozonation efficiency. Enable oxidation of ammoniacal nitrogen at lower pH. Br may reduce the negative impact of low ammonia concentration on ozone efficiency. | |
| Final Ammonia concentration | Between 0.016 and 55 mg $NH_3$—N/L | Lower ammoniacal nitrogen negatively impacts the ozone efficiency. This is especially true below 15 mg$NH_3$—N/L. | |
| Cyanate concentration | 50 mg CNO—N/L | Low pH positively impacts the ozonation of CNO—N, and enable direct oxidation to $NO_3$—N. | |

When low ammonia concentration is required at the effluent, such as below 12 mg/l or even below 1 mg/l, a third reactor (not shown in the drawings) can be added after the second reactor 306 to optimize the process set points (such as pH and recirculation flow rate) and injections parameters (gas to liquid ratio, pressure, ozone gas concentration, ozone injection rate) for those low concentration of ammonia. In the situation where the cyanate is absent and only ammonia is required to be treated at low concentration, the $1^{st}$ loop can be used to treat the initial concentration of ammonia down to 12 mg/l and the $2^{nd}$ loop can then treat this concentration down to the required targeted effluent ammonia concentration, down to 0,014 mg/l, if required. It is noted that any type of catalyst can be added to each the recirculation loop to increase the efficiency of ozone, such as hydrogen peroxide, ultraviolet lamp, metallic catalyst, activated carbon, polonite, sodium persulfate, dioxide of titanium and even the used of hydrogen with ultraviolet lamp with or without ozone, as well as the use of electrooxidation.

Examples of parameters usable in the plant 300 are presented in Table 22

TABLE 22 examples of operations set points range and examples of the contaminant concentrations range.

| Parameter | Operation Range | Comments |
|---|---|---|
| pH | 5.0 to 8.5 (to convert CNO to $NO_3$ without generating ammonia) 9.0 to 10.5 (for converting ammonia, $NH_3$, to NO3) 5.0 to 9.0 using bromide to convert $NH_4^+$ to $NO_3$ | |
| Alkalinity | 0 to 350 mg/l mg $CaCO_3$/L | For concentration above this, softening treatment can be applied to reduce the concentration of alkalinity and its inhibitor effect. |
| Temperature | From 1 to 40° C. | CNO removal is not impacted by temperature. For ammonia removal, pH may be increased at low temperature (less than 10 deg C.) to maintain the removal yield. Efficiency of Br is not impacted by the water temperature. |
| Ozone injection rate | | Ozone injection is a limiting factor, no limit due to reaction kinetics. |
| Hydraulic retention time | From about 1 to about 600 seconds, or even more (for example up to 1 hour) | Required retention time will vary based on the contaminant and its concentration. |
| Bromide | From 2 to 200 mg Br/L | Enable conversation of $NH_4^+$ in $NO_3$. Efficiency of Br is not impacted by the concentration of $NH_4^+$. |
| Initial Ammonia concentration | From 1 ppm to 1,000 ppm | Higher the concentration, higher is the ozone efficiency. |
| Final Ammonia concentration | As low as 0.014 mg NH3—N/L or less | Concentration of ammonia at the effluent is function of the amount of ozone injected. |

TABLE 22-continued

| examples of operations set points range and examples of the contaminant concentrations range. | | |
|---|---|---|
| Parameter | Operation Range | Comments |
| Initial Cyanate concentration | Up to 200 mg CNO—N/L and above | Low pH positively impacts the ozonation of CNO—N, and enable direct oxidation to $NO_3$—N. |
| Final Cyanate concentration | As low as 0.47 mg CNO—N/L | Concentration of cyanate at the effluent is function of the amount of ozone injected. |
| Initial Nitrite concentration | Up to 26 mg $NO_2$—N/L and above | |
| Final Nitrite concentration | As low as the limit of detection ≤0.01mg $NO_2$—N/L | Concentration of cyanate at the effluent is function of the amount of ozone injected. |
| Initial thiocyanate concentration | Up to 108 mg SCN—N/mg/L and above | |
| Final thiocyanate concentration | As low as the limit of detection ≤0.05 mg SCN—N/L | Concentration of cyanate at the effluent is function of the amount of ozone injected. |

Example 2

A larger scale unit was built with a conception similar to that of the above-described unit. Similar results were obtained. Of interest, the parameter space explored in this second set of experiments allowed to better characterize the effect of temperature in the proposed treatments. Indeed, in Nordic climates would greatly influence the process water temperature. This parameter was studied to quantify its impact on the efficiency of the treatment.

The temperature has the potential to impact ozone efficiency in many ways. First, the solubility of ozone decreases as the temperature of water increases, which may impact the mass transfer efficiency of an ozone system. Also, a decrease in temperature favors the presence of ionized ammonia, which is known to be less reactive with ozone than unionized ammonia and, reaction kinetics increase with a temperature increase. Therefore, one would expect that treatments at low temperatures would be relatively ineffective.

The control of the water temperature was achieved with a cooling recirculation loop including a recirculation pump, a chiller, and a plate heat exchanger (until September, all tests were controlled with a coil instead of a plate heat exchanger). The temperature was measured in the atmospheric reactor until the plate heat exchanger was installed. The measure was then directly after the plate heat exchanger. Results are presented in Table 22.

TABLE 22

| Effect of Temperature on Ammoniacal Nitrogen Removal by Ozonation | | | | | | |
|---|---|---|---|---|---|---|
| Trial # | Raw Water AN (mg NH3—N/L) | Final AN (mg NH3—N/L) | Temp. (° C.) | AN Rate of Reaction (DNH4/Dt) | OUE (%) | Off-Gas Ozone Loss (%) |
| pH of 9.6 at injection Point | | | | | | |
| 144 | 60.1 | 14.0 | 1.7 | 0.54 | 86.0% | 15.8% |
| 114 | 57.0 | 12.1 | 3.9 | 0.53 | 85.4% | 12.6% |
| 77 | 58.0 | 12.7 | 5.5 | 0.53 | 84.5% | 13.6% |
| 94 | 60.6 | 14.5 | 5.9 | 0.54 | 95.7% | 11.4% |
| 95 | 61.7 | 13.6 | 6.3 | 0.56 | 95.5% | 11.9% |
| 101 | 62.6 | 15.2 | 6.9 | 0.56 | 95.9% | 7.8% |
| 102 | 62.6 | 10.0 | 6.9 | 0.62 | 108.0% | 8.0% |
| 80 | 62.3 | 12.1 | 14.1 | 0.59 | 94.2% | 5.9% |
| 145 | 60.3 | 9.3 | 15.4 | 0.60 | 95.8% | 7.8% |
| 98 | 59.4 | 9.9 | 21.0 | 0.58 | 95.1% | 3.1% |
| 96 | 57.7 | 8.7 | 25.1 | 0.57 | 92.0% | 2.2% |
| pH of 10.0 at Injection Point | | | | | | |
| 143 | 69.5 | 13.1 | 1.4 | 0.66 | 107.3% | 10.2% |
| 115 | 58.3 | 10.6 | 3.6 | 0.56 | 90.9% | 8.3% |

AN: Ammoniacal Nitrogen

27

28

As seen with the pH 9.6 series, the process efficiency, as measured by the OUE remains relatively high, even at temperatures as low as 1° C., which implies the low effect of temperature on the oxidation reaction. This surprising result shows an edge compared to biological treatment as the ozone treatment can be pursued under a wide range of temperatures without requesting control.

At lower temperatures (<4° C.), a correction of the pH may be used to keep the same efficiency. The pH 10.0 series shows this positive effect of adjusting the pH to compensate for the OUE decrease at a lower temperature. This can be correlated with the unionized ammonia concentration which depends on temperature. The unionized ammonia fraction diminishes as the temperature lowers at constant pH. Increasing the pH translates to an increase in unionized ammonia at a constant temperature.

Although the present invention has been described hereinabove by way of preferred embodiments thereof, it can be modified, without departing from the spirit and nature of the subject invention as defined in the appended claims.

What is claimed is:

1. A method of treating mining effluents, the method comprising:

providing mining effluents containing at least one nitrogenated compound selected from the contaminant group consisting of: ammoniacal nitrogen, nitrite ions, nitrate ions, thiocyanate ions, weak acid dissociable cyanide ions and cyanide ions, the mining effluents further containing cyanate ions;

performing a first ozone treatment on the mining effluents;

performing a second ozone treatment on the mining effluents after the first ozone treatment; and adding an alkaline chemical to the mining effluent between the first and second ozone treatments;

wherein the first and second ozone treatments are performed respectively at first and second pH, wherein the second ozone treatment is performed at a higher pH than the first ozone treatment, wherein the first pH is larger than 6.5 and smaller than 8.5 and wherein the second pH is larger than 8.5 and smaller than 10.5;

wherein the first and second treatments together reduce a concentration of the at least one nitrogenated compound in the mining effluents.

2. The method as defined in claim 1, wherein the first and second ozone treatments together reduce a total concentration of all the nitrogenated compound from the contaminant group present in the mining effluent.

3. The method as defined in claim 1, wherein the alkaline chemical product is selected from the group consisting of NaOH and lime.

4. The method as defined in claim 1, wherein the first pH is larger than 7.0 and smaller than 8.0.

5. The method as defined in claim 1, wherein the second pH is larger than 9 and smaller than 10.

6. The method as defined in claim 1, wherein the mining effluent contains both ammoniacal nitrogen and at least one cyanide species selected from the group consisting of thiocyanate ions, weak acid dissociable cyanide ions, cyanide ions and cyanate ions.

7. The method as defined in claim 1, wherein at least 0.2 g of ozone per liter of mining effluent is added to the mining effluent during at least of one of the first and second ozone treatments.

8. The method as defined in claim 1, wherein at least 1 g of ozone per liter of mining effluent is added to the mining effluent during at least of one of the first and second ozone treatments.

9. The method as defined in claim 1, further comprising softening the mining effluent after the first ozone treatment.

10. The method as defined in claim 9, wherein softening is performed by adding lime to the mining effluent.

11. The method as defined in claim 1, wherein the first and second ozone treatments are performed at a temperature lower than 5° C.

12. The method as defined in claim 1, wherein the first and second ozone treatments are performed at a temperature of 1° C. or lower.

13. The method as defined in claim 1, further comprising, after the second ozone treatment, at least one of:

lowering a pH of the mining effluent;

removing dissolved metal in the mining effluent;

removing suspended solids in the mining effluent.

14. The method as defined in claim 1, further comprising reducing an alkalinity of the mining effluent prior to at least one of the first and second ozone treatments.

15. The method as defined in claim 1, further comprising adding a base to the mining effluent while at least one of the first and second ozone treatments is performed to maintain the mining effluent within a predetermined pH range.

16. The method as defined in claim 1, further comprising adding bromide in the mining effluents.

17. The method as defined in claim 16, wherein the bromide is added after completion of the first ozone treatment.

* * * * *